United States Patent
Seo et al.

(10) Patent No.: US 10,085,218 B2
(45) Date of Patent: Sep. 25, 2018

(54) METHOD AND APPARATUS FOR CONTROLLING UPLINK TRANSMISSION POWER IN WIRELESS COMMUNICATION SYSTEM SUPPORTING MACHINE-TYPE COMMUNICATION

(71) Applicant: LG ELECTRONICS INC., Seoul (KR)

(72) Inventors: Hanbyul Seo, Seoul (KR); Kijun Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/573,750

(22) PCT Filed: May 13, 2016

(86) PCT No.: PCT/KR2016/005102
§ 371 (c)(1),
(2) Date: Nov. 13, 2017

(87) PCT Pub. No.: WO2016/182392
PCT Pub. Date: Nov. 17, 2016

(65) Prior Publication Data
US 2018/0124709 A1    May 3, 2018

Related U.S. Application Data

(60) Provisional application No. 62/161,232, filed on May 13, 2015, provisional application No. 62/184,836, (Continued)

(51) Int. Cl.
*H04B 7/00* (2006.01)
*H04W 52/14* (2009.01)
(Continued)

(52) U.S. Cl.
CPC ....... *H04W 52/146* (2013.01); *H04W 52/325* (2013.01); *H04W 52/367* (2013.01)

(58) Field of Classification Search
CPC ............. H04W 52/146; H04W 52/325; H04W 52/367
See application file for complete search history.

(56) References Cited

U.S. PATENT DOCUMENTS 9,288,766 B2 * 3/2016 Larsson ............... H04W 52/146
9,668,226 B2 * 5/2017 Larsson ................ H04W 52/34
(Continued)

FOREIGN PATENT DOCUMENTS

KR    10-2013-0032375 A    4/2013
WO    WO 2015/002516 A1    1/2015

OTHER PUBLICATIONS

Intel Corporation, "A-MPR for Band 42 CA and Band 43 UE-UE Coexistence," 3GPP TSG-RAN WG4 Meeting #74, R4-150135, Athens, Greece, Feb. 9-13, 2015 (Feb. 3, 2015), 11 pages.

*Primary Examiner* — Dominic Rego
(74) *Attorney, Agent, or Firm* — Birch, Stewart, Kolasch & Birch, LLP

(57) ABSTRACT

The present invention relates to a wireless communication system. Specifically, the present invention may comprises: a step of a terminal calculating a first maximum power reduction value to be applied to a first uplink channel; and a step of transmitting, from a plurality of subframes, the first uplink channel at the maximum transmission power by applying the first maximum power reduction value. The first uplink channel is transmitted through different frequency resources within the plurality of subframes. The maximum transmission power value has different values according to frequency resources through which specific channels are transmitted. The first maximum power reduction value is a predetermined value applied during the transmission of the first uplink channel.

14 Claims, 12 Drawing Sheets

Related U.S. Application Data filed on Jun. 25, 2015, provisional application No. 62/202,930, filed on Aug. 10, 2015.

(51) Int. Cl.
*H04W 52/32* (2009.01)
*H04W 52/36* (2009.01)

(56) References Cited

U.S. PATENT DOCUMENTS

| | | | |
|---|---|---|---|
| 2008/0159184 A1* | 7/2008 | Niwano | H04W 52/286 370/278 |
| 2012/0176979 A1 | 7/2012 | Kim et al. | |
| 2014/0153433 A1* | 6/2014 | Zhou | H04W 72/1231 370/252 |
| 2015/0011236 A1 | 1/2015 | Kazmi et al. | |
| 2015/0078188 A1* | 3/2015 | Xu | H04W 52/367 370/252 |
| 2015/0124661 A1* | 5/2015 | He | H04L 5/0066 370/278 |
| 2015/0131452 A1* | 5/2015 | Choi | H04W 72/0446 370/241 |
| 2015/0163750 A1* | 6/2015 | Zhang | H04W 52/146 455/509 |
| 2015/0358927 A1* | 12/2015 | Gao | H04W 52/365 370/329 |
| 2016/0021618 A1* | 1/2016 | Yin | H04W 52/146 370/280 |
| 2016/0262117 A1* | 9/2016 | Wang | H04W 52/325 |
| 2017/0111869 A1* | 4/2017 | Zhang | H04W 52/146 |

* cited by examiner

METHOD AND APPARATUS FOR CONTROLLING UPLINK TRANSMISSION POWER IN WIRELESS COMMUNICATION SYSTEM SUPPORTING MACHINE-TYPE COMMUNICATION

CROSS REFERENCE TO RELATED APPLICATIONS

This application is the National Phase of PCT International Application No. PCT/KR2016/005102, filed on May 13, 2016, which claims priority under 35 U.S.C. 119(e) to U.S. Provisional Application No. 62/161,232, filed on May 13, 2015, No. 62/184,836, filed on Jun. 25, 2015, and No. 62/202,930, filed on Aug. 10, 2015, all of which are hereby expressly incorporated by reference into the present application.

TECHNICAL FIELD

The present invention relates to a wireless access system supporting MTC (machine-type communication), and more particularly, to methods for an MTC UE to control uplink transmit power and apparatuses supporting the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE OF THE INVENTION

Technical Problem

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

Technical Solution

To achieve these and other advantages and in accordance with the purpose of the present invention, as embodied and broadly described, according to one embodiment, a method of controlling uplink transmit power, which is controlled by an MTC UE in a wireless communication system supporting MTC (machine type communication), includes the steps of calculating a first maximum power reduction value to be applied to a first uplink channel, and transmitting the first uplink channel using maximum transmit power to which the first maximum power reduction value is applied within a plurality of subframes. In this case, the first uplink channel is transmitted via frequency resources different from each other in a plurality of the subframes, the maximum transmit power includes a different value according to a frequency resource in which a specific channel is transmitted, and a prescribed value can be applied to the first maximum power reduction value while the first uplink channel is transmitted.

To further achieve these and other advantages and in accordance with the purpose of the present invention, according to a different embodiment, an MTC UE for controlling uplink transmit power in a wireless communication system supporting MTC (machine type communication) includes a transceiver and a processor configured to control the transceiver, the processor configured to calculate a first maximum power reduction value to be applied to a first uplink channel, the processor configured to transmit the first uplink channel using maximum transmit power to which the first maximum power reduction value is applied in a plurality of subframes. In this case, the first uplink channel is transmitted via frequency resources different from each other in a plurality of the subframes, the maximum transmit power includes a different value according to a frequency resource in which a specific channel is transmitted, and a prescribed value can be applied to the first maximum power reduction value while the first uplink channel is transmitted.

Following items can be commonly applied to each of the aspects of the present invention.

The maximum power reduction value may correspond to at least one of MPR (maximum power reduction) and A-MPR (advanced maximum power reduction).

And, the first maximum power reduction value may correspond to a maximum value among maximum power reduction values which are calculated according to each of a plurality of the subframes.

Or, the first maximum power reduction value may correspond to a maximum value among maximum power reduction values which are calculated according to each of a slots within the plurality of the subframes.

Moreover, the maximum power reduction value can be determined according to at least one selected from the group consisting of a position of a resource block of the first uplink channel, the number of resource blocks, and a modulation scheme.

The first uplink channel may correspond to a physical uplink control channel (PUCCH) for transmitting uplink control information or a physical uplink data channel (PUSCH) for transmitting user data.

Advantageous Effects

According to the present invention, it is able to efficiently transmit and receive control information in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Mode for Invention

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

In a wireless communication system, a user equipment (UE) receives information from a base station (BS) on downlink (DL) and transmits information to the BS on uplink (UL). In LTE(-A), DL transmission is performed using OFDMA and uplink transmission is performed using single carrier frequency division multiple access (SC-FDMA).

Figure 1:
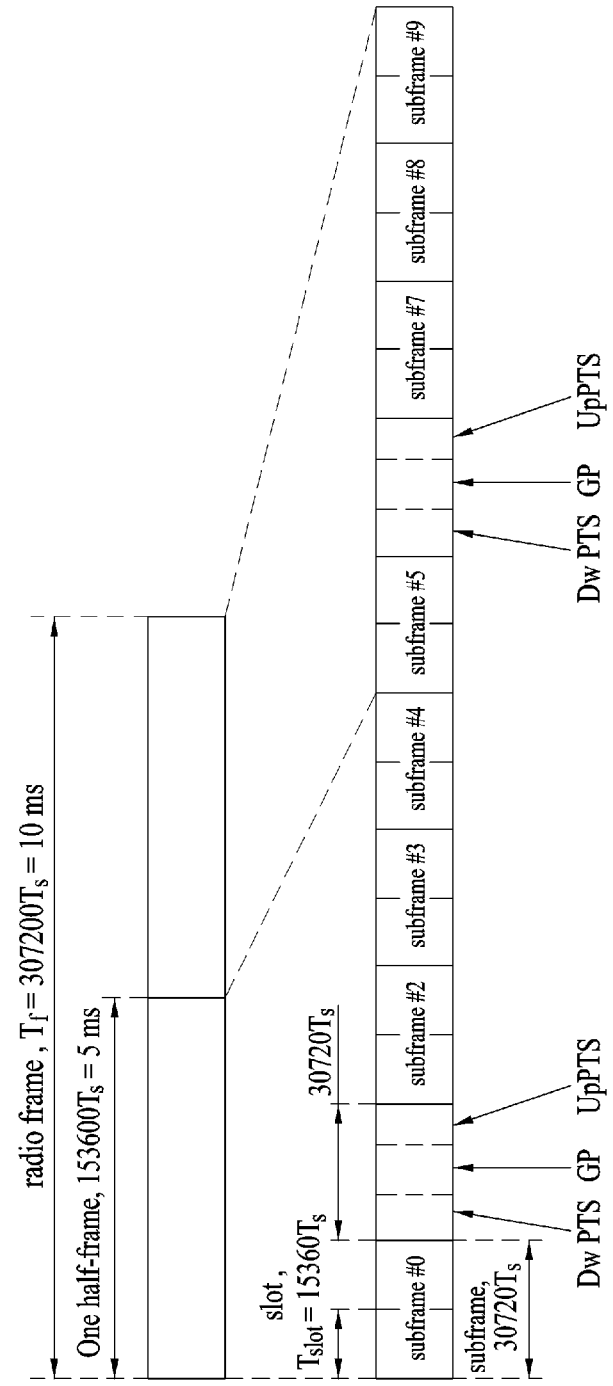
FIG. 1 illustrates a radio frame structure.

FIG. 1 illustrates a radio frame structure.

FIG. 1($a$) illustrates a type-1 radio frame structure for frequency division duplex (FDD). A radio frame includes a plurality of (e.g. 10) subframes each of which includes a plurality of (e.g. 2) slots in the time domain. Each subframe has a duration of 1 ms and each slot has a duration of 0.5 ms. A slot includes a plurality of OFDM/SC-FDMA symbols in the time domain and includes a plurality of resource blocks (RBs) in the frequency domain.

FIG. 1($b$) illustrates a type-2 radio frame structure for time division duplex (TDD). The type-2 radio frame includes 2 half frames. Each half frame includes 5 subframes each of which includes 2 slots.

Table 1 shows a UL-DL configuration (Uplink-Downlink Configuration, UL-DL Cfg or UD-cfg) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
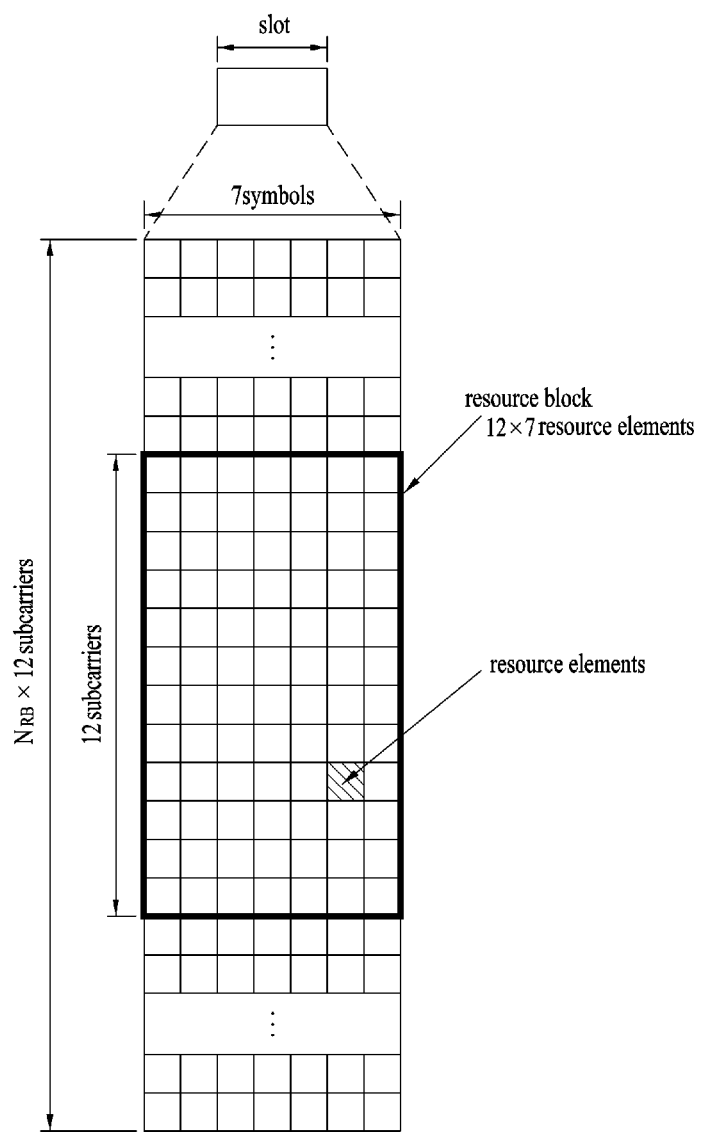
FIG. 2 illustrates a resource grid of a downlink slot.

FIG. 2 illustrates a resource grid of a DL slot.

Referring to FIG. 2, a DL slot includes a plurality of OFDMA (or OFDM) symbols in the time domain. One DL slot may include 7(6) OFDMA symbols according to cyclic prefix (CP) length, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of a UL slot may be same as that of the DL slot except that OFDMA symbols by replaced by SC-FDMA symbols.

Figure 3:
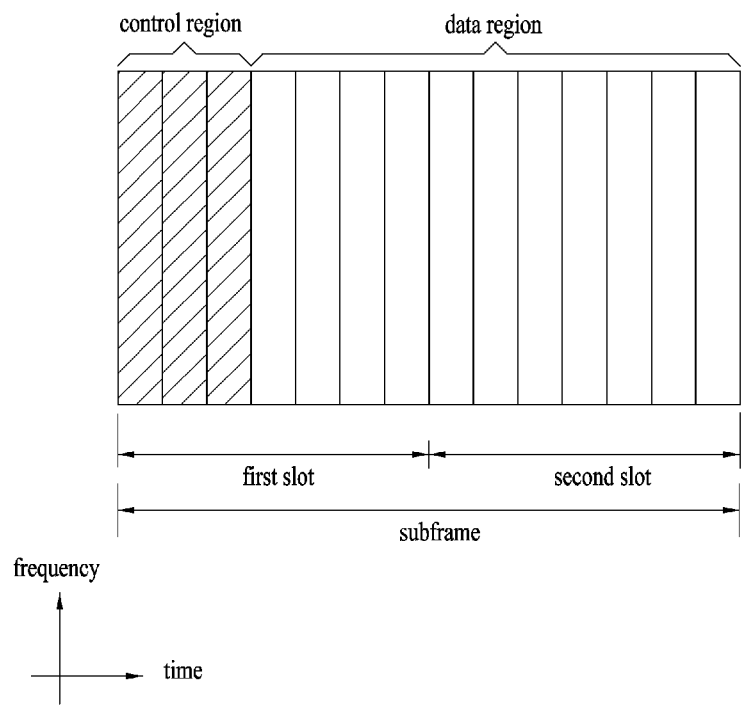
FIG. 3 illustrates a downlink subframe structure.

FIG. 3 illustrates a DL subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of DL control channels include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ-ACK signal.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. Downlink control information (DCI) is transmitted through the PDCCH. DCI formats 0/4 (referred to as UL DCI formats hereinafter) for UL scheduling (or UL grant (UG)) and DCI formats 1/1A/1B/1C/1D/2/2A/2B/2C/2D (referred to as DL DCI formats) DL scheduling are defined. The DCI formats selectively include information such as hopping flag, RB allocation, MCS (Modulation Coding Scheme), RV (Redundancy Version), NDI (New Data Indicator), TPC (Transmit Power Control), DMRS (Demodulation Reference Signal) cyclic shift, etc. as necessary.

A plurality of PDCCHs can be transmitted within a control region. A UE monitors the plurality of PDCCHs per subframe in order to check a PDCCH destined therefor. The PDCCH is transmitted through one or more control channel elements (CCEs). A PDCCH coding rate may be controlled by the number of CCEs (i.e. CCE aggregation level) used for PDCCH transmission. A CCE includes a plurality of resource element groups (REGs). A format of the PDCCH and the number of PDCCH bits are determined by the number of CCEs. A BS determines a PDCCH format according to DCI to be transmitted to the UE, and attaches a cyclic redundancy check (CRC) to control information. The CRC is masked with an identifier (e.g. a radio network temporary identifier (RNTI)) according to an owner or usage of the PDCCH. If the PDCCH is for a specific UE, then an identifier (e.g., cell-RNTI (C-RNTI)) of the UE may be masked to the CRC. If the PDCCH is for a paging message, then a paging identifier (e.g., paging-RNTI (P-RNTI)) may be masked to the CRC. If the PDCCH is for system information (more specifically, a system information block (SIB)), then a system information RNTI (SI-RNTI) may be masked to the CRC. When the PDCCH is for a random access response, then a random access-RNTI (RA-RNTI) may be masked to the CRC.

A PDCCH carries a message known as DCI. In general, a plurality of PDCCHs is transmitted in a subframe. Each PDCCH is transmitted using one or more CCEs. Here, one CCE corresponds to 9 REGs and one REG corresponds to 4 REs. Four QPSK symbols are mapped to each REG. The REs occupied by a reference signal do not belong to the REG, and thus the number of REGs within a given OFDM symbol varies according to whether a cell-specific reference signal is present. The concept of REG can be applied to other downlink control channels (i.e., PCFICH and PHICH). Four PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |

TABLE 2-continued

| PDCCH format | Number of CCEs (n) | Number of REGs | Number of PDCCH bits |
|---|---|---|---|
| 2 | 4 | 36 | 288 |
| 3 | 8 | 72 | 576 |

The CCEs are sequentially numbered and consecutively used. To simplify a decoding process, a PDCCH having a format composed of n CCEs may start only at a CCE having a number corresponding to a multiple of n. The number of CCEs used to transmit a specific PDCCH is determined by a BS according to a channel state. For instance, in case of a PDCCH for a UE having a good DL channel (e.g., a UE adjacent to a BS), one CCE may be sufficient. However, in case of a PDCCH for a UE having a poor channel (e.g., a UE located at a cell boundary), 8 CCEs may be used to obtain sufficient robustness. In addition, a power level of the PDCCH may be adjusted based on the channel state.

In the LTE system, a CCE set in which a PDCCH can be located is defined for each UE. A CCE set in which the UE can detect its PDCCH is referred to as a PDCCH search space or simply as a search space (SS). An individual resource on which a PDCCH can be transmitted in the SS is referred to as a PDCCH candidate. One PDCCH candidate may correspond to 1, 2, 4, or 8 CCEs depending on the CCE aggregation level. The BS transmits an actual PDCCH (DCI) on a random PDCCH candidate in the SS and the UE monitors the SS to detect the PDCCH (DCI). Particularly, the UE attempts to perform blind decoding (BD) on PDCCH candidates in the SS.

In the LTE system, SSs for respective PDCCH formats may have different sizes. In particular, a dedicated SS (or, UE-specific SS (USS)) and a common SS (CSS) are defined. The USS is configured for each individual UE and information on a CSS range is provided to all UEs. At a given UE, the USS and CSS may overlap each other.

Since the SSs have relatively small sizes and they may overlap each other, the BS may be unable to find a CCE resource for transmitting the PDCCH to all of the preferred UEs in a given subframe. This is because, if the CCE resource is allocated for another UE, there may be no CCE resource for a specific UE in an SS of the corresponding UE (blocking). To minimize the possibility that the blocking is maintained until a next subframe, a UE-specific hopping sequence is applied to a starting point of the dedicated SS. Table 3 shows sizes of the USS and CSS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

Figure 4:
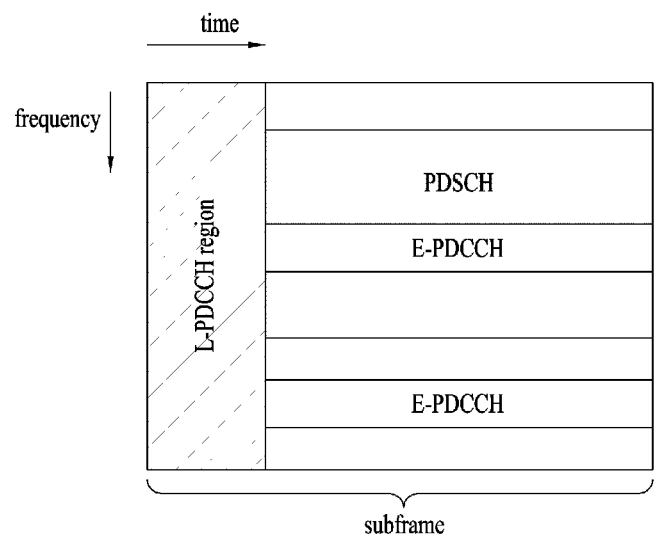
FIG. 4 illustrates an example of Enhanced Physical Downlink Control Channel (EPDCCH)

FIG. 4 illustrates an EPDCCH. The EPDCCH is a channel additionally introduced in LTE-A.

Referring to FIG. 4, a PDCCH (for convenience, legacy PDCCH or L-PDCCH) according to legacy LTE/LTE-A may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similar to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. Unless otherwise specified, the PDCCH in the present specification includes both of the L-PDCCH and EPDCCH.

Figure 5:
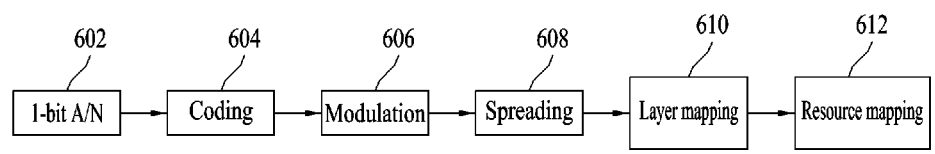
FIG. 5 illustrates a PHICH (Physical Hybrid ARQ Indicator Channel) signal processing process/block.

FIG. 5 illustrates a PHICH signal processing process/block.

Referring to FIG. 5, an A/N generation block 602 generates one piece of 1-bit A/N as a response to a PUSCH in case of MU-MIMO (multi-user multiple input multiple output) and generates two pieces of 1-bit A/N as a response to a PUSCH in case of SU-MIMO (single-user MIMO). Subsequently, (channel) coding 604 (e.g., ⅓ repetition coding), modulation 606 (e.g., BPSK (binary phase shift keying)), spreading 608, layer mapping 610, and resource mapping 612 are applied to the A/N bit for PHICH generation.

Figure 6:
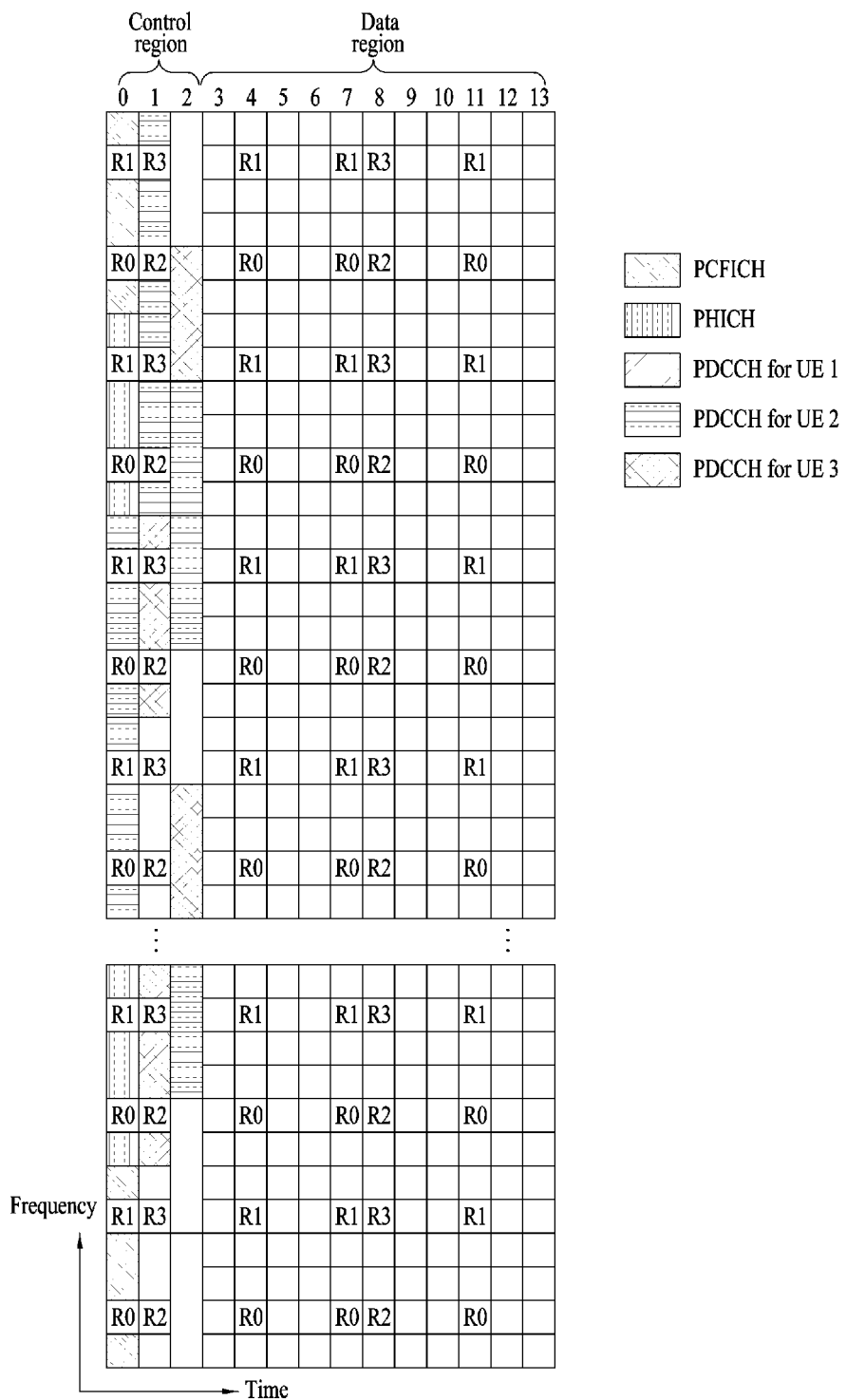
FIG. 6 illustrates a structure of a downlink physical channel.

A plurality of PHICHs may be mapped to the same RE (e.g. REG) and then form a PHICH group. The REG is composed of four neighboring REs among the remaining REs except REs for a reference signal on one OFDM symbol. Each PHICH is identified by an orthogonal sequence (used in spreading) in the PHICH group. FIG. 6 is a diagram for an example of a downlink subframe structure. In the drawing, R1 to R4 indicates CRSs (cell-specific reference signals) for antennas 0 to 3. Referring to FIG. 6, a control region includes a PCFICH, PHICH, and PDCCH. The basic resource of the downlink physical channel is an REG (resource element group). The REG is composed of four neighboring REs except an RS in an OFDMA symbol. The downlink physical channel is mapped to in an order of PCFICH>PHICH>PDCCH. That is, the PHICH is mapped to the rest of the REG except the PCFICH, and then the PDCCH is mapped to the remaining REG except the PCFICH/PHICH. Since PDCCH resources are changed according to PHICH resource, a UE should be aware of PHICH resource allocation information for PHCCH detection.

Figure 7:
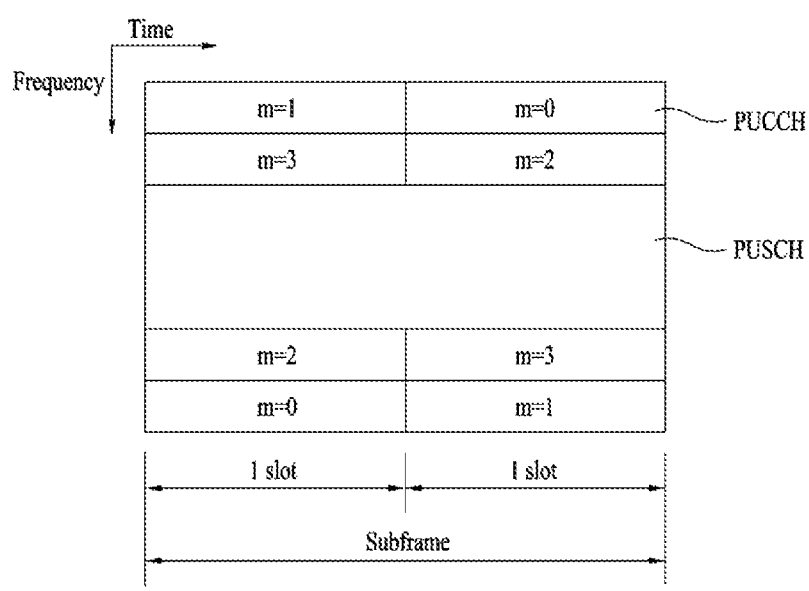
FIG. 7 illustrates the structure of an uplink subframe.

FIG. 7 illustrates a UL subframe structure.

Referring to FIG. 7, a UL subframe includes a plurality of (e.g. 2) slots. A slot may include different numbers of SC-FDMA symbols according to CP lengths. The UL subframe is divided into a control region and a data region in the frequency domain. The data region is used to carry a data signal such as audio data through a physical uplink shared channel (PUSCH). The control region is used to carry uplink control information (UCI) through a physical uplink control channel (PUCCH). The PUCCH includes an RB pair located at both ends of the data region in the frequency domain and hopped in a slot boundary.

The PUCCH can be used to transmit the following control information.

SR (scheduling request): This is information used to request a UL-SCH resource and is transmitted using On-Off Keying (OOK) scheme.

HARQ-ACK: This is an acknowledgement signal for a DL signal (e.g. a PDSCH or SPS release PDCCH). For example, a 1-bit ACK/NACK signal is transmitted as a response to a single DL codeword and a 2-bit ACK/NACK signal is transmitted as a response to two DL codewords.

CSI (channel state information): This is feedback information about a DL channel. The CSI includes a CQI (channel quality indicator), RI (rank indicator), PMI (precoding matrix indicator), PTI (precoding type indicator), etc.

Table 4 shows the mapping relationship between PUCCH formats and UCI in LTE(-A).

TABLE 4

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CSI (20 coded bits) |
| Format 2 | CSI and 1- or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

Figure 8:
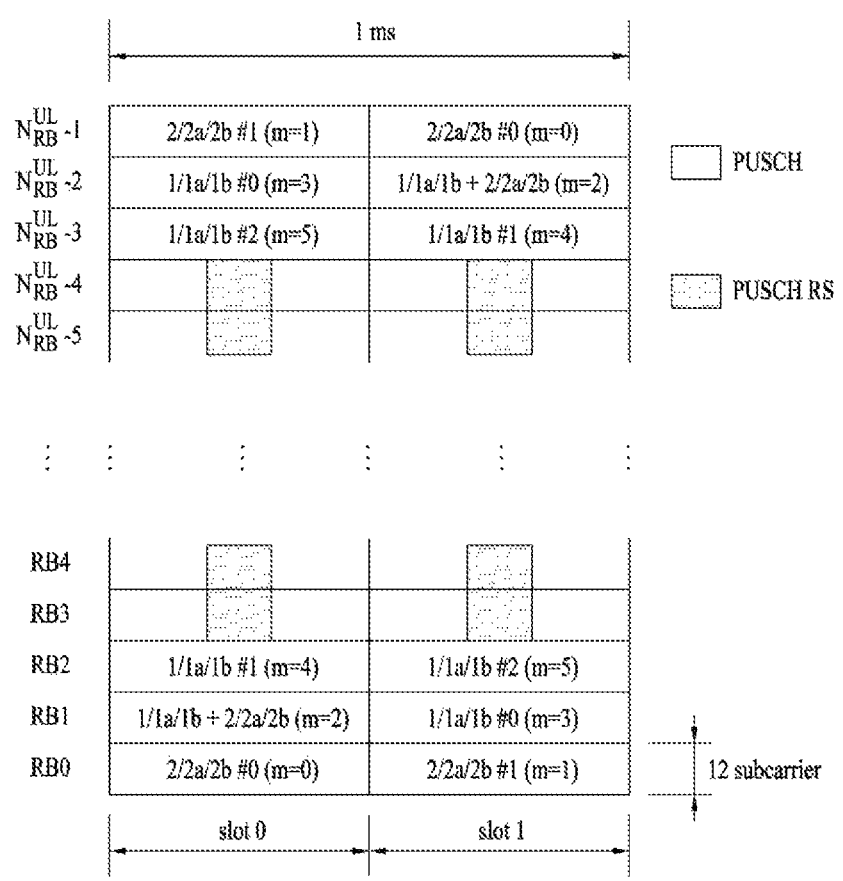
FIG. 8 illustrates an example of physically mapping a PUCCH format to a PUCCH region.

FIG. 8 illustrates an example of physically mapping PUCCH formats to PUCCH regions.

Referring to FIG. 8, the PUCCH formats are mapped to RBs in the order of PUCCH formats 2/2a/2b (CQI) (e.g. PUCCH region m=0, 1), PUCCH formats 2/2a/2b (CQI) or PUCCH formats 1/1a/1b (SR/HARQ ACK/NACK) (e.g. PUCCH region m=2 if present) and PUCCH formats 1/1a/1b (SR/HARQ ACK/NACK) (e.g. PUCCH region m=3, 4, 5) from the band edge to the inside and transmitted. The number of PUCCH RBs that can be used for PUCCH format 2/2a/2b (CQI) is signaled to the UE through broadcast signaling in the cell.

Figure 9:
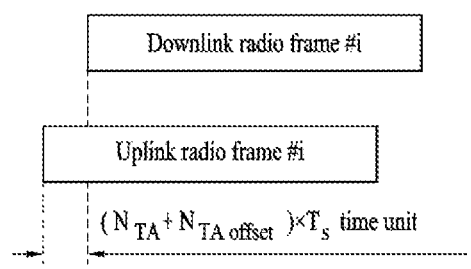
FIG. 9 illustrates an uplink-downlink frame timing relationship.

FIG. 9 illustrates an uplink-downlink frame timing relationship.

Referring to FIG. 9, transmission of uplink radio frame i is started $(N_{TA}+N_{TAoffset})*T_s$ seconds prior to transmission of a downlink radio frame corresponding thereto. In the LTE system, $N_{TA}$ is greater than 0 and less than 20512 ($0 \leq N_{TA} \leq 20512$). Moreover, in the FDD, $N_{TAOffset}$ is set to 0 ($N_{TAOffset}=0$) and in the TDD, $N_{TAOffset}$ is set to 624 ($N_{TAOffset}=624$). $N_{TAOffset}$ is a value previously informed between a BS and a UE. When $N_{TA}$ is indicated through a timing advance command during a random access procedure, the UE adjusts a transmission timing of a UL signal (e.g. PUCCH/PUSCH/SRS) through the above expression. The UL transmission timing is set to a multiple of 16 Ts. The timing advance command indicates a change in the UL timing with reference to the current UL timing. The timing advance command $T_A$ in the random access response is 11-bits. $T_A$ indicates a value between 0, 1, 2, . . . , 1282 and the timing adjustment value $N_{TA}$ is given as $N_{TA}=TA*16$. In other cases, $T_A$ is 6-bits and indicates a value between 0, 1, 2, . . . , 63. The timing adjustment value $N_{TA}$ is given as $N_{TA,new}=N_{TA,old}+(T_A-31)*16$. The timing advance command received in a subframe n is applied from a subframe (n+6). In the case of FDD, a transmission timing of a UL subframe n is advanced with reference to the start point of a DL subframe n as shown in the drawing. In the case of TDD, a transmission timing of a UL subframe n is advanced with reference to the end point of a DL subframe (n+1) (not shown in the drawing).

Figure 10:
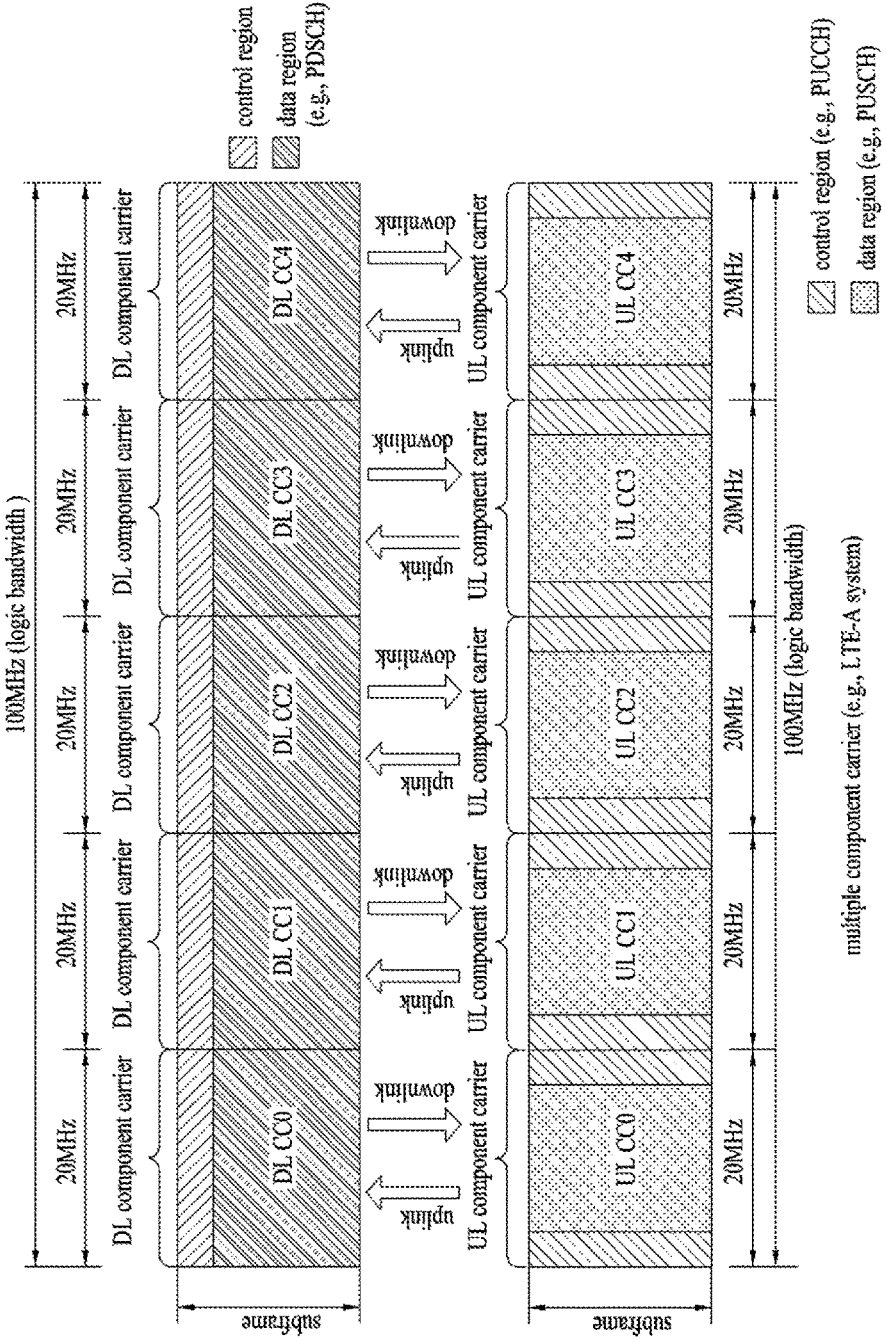
FIG. 10 illustrates a carrier aggregation (CA)-based wireless communication system.

FIG. 10 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 10, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be configured cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of DL resources and UL resources. Yet, the UL resources are not mandatory. Therefore, a cell may be composed of DL resources only or both DL resources and UL resources. The linkage between the carrier frequencies (or DL CCs) of DL resources and the carrier frequencies (or UL CCs) of UL resources may be indicated by system information when CA is supported. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and one or more SCells, for a UE in an RRC_CONNECTED state, for which CA is set.

When a plurality of CCs is configured, cross-CC scheduling and non-cross-CC scheduling may be used. Non-cross-CC scheduling corresponds to scheduling in LTE. When cross-CC scheduling is applied, a DL grant PDCCH may be transmitted on DL CC#0 and a PDSCH corresponding thereto may be transmitted on DL CC#2. Similarly, a UL grant PDCCH may be transmitted on DL CC#0 and a PUSCH corresponding thereto may be transmitted on DL CC#4. For cross-CC scheduling, a carrier indicator field (CIF) is used. Presence or absence of a CIF in a PDCCH may be semi-statically and UE-specifically (or UE-group-specifically) configured through higher layer signaling (e.g. RRC signaling).

Scheduling according to the CIF may be arranged as follows.

- CIF disabled: a PDCCH on a DL CC is used to allocate a PDSCH resource on the same DL CC or a PUSCH resource on a linked UL CC.
- CIF enabled: a PDCCH on a DL CC can be used to allocate a PDSCH or PUSCH resource on a specific DL/UL CC from among a plurality of aggregated DL/UL CCs using the CIF.

When the CIF is present, the BS may allocate a monitoring DL CC to reduce blind detection complexity of the UE. For PDSCH/PUSCH scheduling, the UE may detect/decode a PDCCH only on the corresponding DL CCs. In addition, the BS may transmit a PDCCH only through the monitoring DL CC (set). The monitoring DL CC set may be UE-specifically, UE-group-specifically or cell-specifically configured.

First of all, determination of PUSCH transmit power for a user equipment to transmit PUSCH in 3GPP LTE/LTE-A system is described in the following description. The following Formula 1 is a formula to determine transmit power of a user equipment in case that PUSCH is transmitted only, while PUCCH is not simultaneously transmitted in a subframe index i of a serving cell c in a CA supportive system.

$$P_{PUSCH_c}(i) = \min \begin{cases} P_{CMAX,c}(i), \\ 10\log_{10}(M_{PUSCH,c}(i)) + P_{O\_PUSCH_c}(j) + \alpha_c(j) \cdot PL_c + \\ \Delta_{TF,c}(i) + f_c(i) \end{cases} \quad [dBm]$$

[Formula 1]

The following Formula 2 is a formula to determine transmit power of a user equipment in case that PUCCH and PUSCH are simultaneously transmitted in a subframe index i of a serving cell c in a CA supportive system $$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \\ \Delta_{TF,c}(i) + f_c(i) \end{cases} \quad [dBm]$$

[Formula 2]

Parameters described in the following in relation to the Formula 1 and the Formula 2 correspond to parameters necessary for determining UL transmit power of a user equipment in a serving cell c. In this case, $P_{CMAX,c}(i)$ of the Formula 1 indicates transmittable maximum transmit power of a user equipment in the subframe index i and $\hat{P}_{CMAX,c}(i)$ of the Formula 2 indicates a linear value of $P_{CMAX,c}(i)$. $\hat{P}_{PUCCH}(i)$ of the Formula 2 indicates a linear value of $P_{PUCCH}(i)$. In this case, $P_{PUCCH}(i)$ indicates PUCCH transmit power in the subframe index i.

In the Formula 1, $M_{PUSCH,c}(i)$ is a parameter indicating a bandwidth of PUSCH resource allocation represented by the number of resource block valid for the subframe i. This parameter is a value assigned by a base station. $P_{O\_PUSCH,c}(j)$ is a parameter configured by the sum of a cell-specific nominal component $P_{O\_NOMINAL\_PUSCH,c}(j)$ provided by an upper layer and a UE-specific component $P_{O\_UE\_PUSCH,c}(j)$ provided by an upper layer. A base station informs a user equipment of this value. In case of PUSCH transmission/retransmission corresponding to a dynamically scheduled grant, j equals to 1. In case of PUSCH transmission/retransmission corresponding to a random access response grant, j equals to 2. And, it may be represented as follows. $P_{O\_PUSCH,c}(2)=0$ and $P_{O\_NOMINAL\_PUSCH,c}(2)= P_{O\_PRE}+\Delta_{PREAMBLE\_Msg3}$. Parameters such as $P_{O\_PRE}$ (preamableInitialReceivedTargetPower) and $\Delta_{PREAMBLE\_Msg3}$ are signaled in an upper layer.

$\alpha_c(j)$ corresponds to a pathloss compensation factor. This is an upper layer providing cell-specific parameter transmitted by a base station by 3 bits. $\alpha \in \{0, 0.4, 0.5, 0.6, 0.7, 0.8, 0.9, 1\}$ where j=0 or 1 and $\alpha_c(j)=1$ where j=2. A base station informs a user equipment of this value.

Pathloss ($PL_c$) is a DL pathloss (or, signal loss) estimation value calculated by a user equipment in dB unit and is represented as PLc=referenceSignalPower−higher layer filteredRSRP. In this case, a base station can inform a user equipment of the referenceSignalPower via an upper layer.

$f_c(i)$ is a value indicating a current PUSCH power control adjustment state for the subframe index i and can be represented by a current absolute value or an accumulated value. If an accumulation is enabled based on a parameter Accumulation-enabled provided by an upper layer or if a TPC command $\delta_{PUSCH,c}$ is included in PDCCH together with a DCI format 0 for a serving cell c where a CRC is scrambled with a temporary C-RNTI, it satisfies $f_c(i)=f_c(i-1)+ \delta_{PUSCH,c}(i-K_{PUSCH})$. $\delta_{PUSCH,c}(i-K_{PUSCH})$ is signaled on PDCCH together with a DCI format 0/4 or a DCI format 3/3A in a subframe $i-K_{PUSCH}$. In this case, $f_C(0)$ is a first value after an accumulated value is reset.

A value of $K_{PUSCH}$ is defined by a LTE standard as follows.

Regarding FDD (frequency division duplex), the value of $K_{PUSCH}$ corresponds to 4. Regarding TDD UL/DL configuration 1-6, the value of $K_{PUSCH}$ is listed in Table 4 as follows. For a TDD UL/DL configuration 0, an LSB (least significant bit) of an UL index is configured by 1. If PUSCH transmission is scheduled together with PDCCH of DCI format 0/4 in a subframe 2 or 7, the value of $K_{PUSCH}$ corresponds to 7. The values of $K_{PUSCH}$ for other PUSCH transmissions are listed in Table 5.

TABLE 5

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

Except a DRX situation, a user equipment attempts to decode PDCCH of a DCI format 0/4 with C-RNTI of the user equipment or PDCCH of a DCI format 3/3A and a DCI format for SPS C-TNTI with TPC-PUSCH-RNTI of the user equipment in every subframe. If the DCI format 0/4 and the DCI format 3/3A for a serving cell c are detected in an identical subframe, the user equipment should use $\delta_{PUSCH,c}$ provided by the DCI format 0/4. If there is no TPC command decoded for the serving cell c, a DRX situation occurs, or i is not an UL subframe in TDD, it satisfies $\delta_{PUSCH,c}=0$ dB.

$\delta_{PUSCH,c}$ accumulated value signaled on PDCCH together with a DCI format 0/4 is listed in Table 5 as follows. If PDCCH going along with a DCI format 0 is validated or released by SPS activation, it satisfies $\delta_{PUSCH,c}=0$ dB.

$\delta_{PUSCH,c}$ accumulated value signaled on PDCCH together with a DCI format 3/3A may correspond to one of a set 1 in the following Table 5 or may correspond to one of a set 2, which is determined by a TPC-index parameter provided by an upper layer, in the following Table 6.

TABLE 5

| TPC Command Field in DCI format 0/3/4 | Accumulated $\delta_{PUSCH, c}$ [dB] | Absolute $\delta_{PUSCH, c}$ [dB] only DCI format 0/4 |
|---|---|---|
| 0 | −1 | −4 |
| 1 | 0 | −1 |
| 2 | 1 | 1 |
| 3 | 3 | 4 |

TABLE 6

| TPC Command Field in DCI format 3A | Accumulated $\delta_{PUSCH, c}$ [dB] |
|---|---|
| 0 | −1 |
| 1 | 1 |

If a user equipment reaches a $P_{CMAX,c}$ for a serving cell c, a positive TPC command for the serving cell c is not accumulated. If a user equipment reaches lowest power, a negative TPC command is not accumulated.

For the serving cell c, when $P_{O\_UE\_PUSCH,c}(j)$ value changes in an upper layer and when a user equipment receives a random access response message in a primary cell, the user equipment resets an accumulation in the following cases.

If an accumulation is not enabled based on a parameter Accumulation-enabled provided by an upper layer, it satisfies $f_c(i)=\delta_{PUSCH,c}(i-K_{PUSCH})$. In this case, $\delta_{PUSCH,c}(i-K_{PUSCH})$ is signaled on PDCCH together with a DCI format 0/4 in a subframe $i-K_{PUSCH}$.

A value of $K_{PUSCH}$ is as follows. Regarding FDD (frequency division duplex), the value of $K_{PUSCH}$ corresponds to 4. Regarding TDD UL/DL configuration 1-6, the value of $K_{PUSCH}$ is listed in Table 4 as follows. For a TDD UL/DL configuration 0, an LSB (least significant bit) of an UL index is configured by 1. If PUSCH transmission is scheduled together with PDCCH of DCI format 0/4 in a subframe 2 or 7, the value of $K_{PUSCH}$ corresponds to 7. The values of $K_{PUSCH}$ for other PUSCH transmissions are listed in Table 4.

$\delta_{PUSCH,c}$ accumulated value signaled on PDCCH together with a DCI format 0/4 is listed in aforementioned Table 5. If PDCCH going along with a DCI format 0 is validated or released by SPS activation, it satisfies $\delta_{PUSCH,c}=0$ dB.

If there is no PDCCH going along with a DCI format decoded for a serving cell c, a DRX (discontinued reception) occurs, or i is not an UL subframe in TDD, it satisfies $f_c(i)=f_c(i-1)$.

For $f_c(*)$ (an accumulated value or a current absolute value), a first value is configured as follows.

Regarding a serving cell c, if $P_{O\_UE\_PUSCH,c}(j)$ value changes in an upper layer or if $P_{O\_UE\_PUSCH,c}(j)$ value is received by an upper layer and the serving cell c corresponds to a secondary cell, it satisfies $f_c(0)=0$. On the other hand, if a serving cell corresponds to a primary cell, it satisfies $f_c(0)\Delta P_{rampup}+\delta_{msg2}$. $\delta_{msg2}$ is a TPC command indicated by a random access response and $\Delta P_{rampup}$ corresponds to the total power ramp-up from the first to the last preamble provided by an upper layer.

In relation to the present invention, if a TPC command operates in an accumulated mode in uplink power control (ULPC), an accumulated value may operate according to a related art as follows. When $P_{O\_UE\_PUSCH,c}(j)$ value is changed in an upper layer for a serving cell c and a user equipment receives a random access response in a primary cell, the user equipment should reset accumulation in the following case.

The following Formula 3 is a formula related to uplink power control for PUCCH in LTE-A system.

$$P_{PUCCH}(i) = \min \begin{Bmatrix} P_{CMAX,c}(i), \\ P_{O\_PUCCH} + PL_c + h(n_{CQI}, n_{HARQ}, n_{SR}) + \Delta_{F\_PUCCH}(F) + \\ \Delta_{TxD}(F') + g(i) \end{Bmatrix}$$

[Formula 3]

[dBm]

In the Formula 3, i and c indicate a subframe index and a cell index, respectively. If a user equipment is configured to transmit PUCCH via two antenna) ports by an upper layer, $\Delta_{TxD}(F')$ value is provided to the user equipment by the upper layer, otherwise, it becomes 0. A parameter described in the following relates to a serving cell corresponding to a cell index c.

In this case, i and $P_{CMAX}$ indicate a subframe index and maximum transmittable power of the user equipment, respectively. $P_{O\_PUCCH}$ is a parameter configured by a sum of cell-specific parameters. $P_{O\_PUCCH}$ is informed by a base station via an upper layer signaling. PL is a DL pathloss (or, signal loss) estimation value calculated by a user equipment in dB unit and is represented as PL=referenceSignalPower−higher layer filteredRSRP. h(n) is a value varying according to a PUCCH format, $n_{CQI}$ is the number of information bits for CQI (channel quality information), and $n_{HARQ}$ indicates the number of HARQ bits. $\Delta_{F\_PUCCH}(F)$ value is a value relative to a PUCCH format 1a and corresponding to PUCCH format (F). This value is informed by a base station via an upper layer signaling. g(i) indicates adjustment state of a current PUCCH power control in a subframe of index i.

$h(n_{CQI}, n_{HARQ}, n_{SR})$ corresponds to 0 in PUCCH format 1, 1a, and 1b. If one or more serving cells are set to a user equipment in the PUCCH format 1b, it can be represented as $$h(n_{CQI}, n_{HARQ}, n_{SR}) = \frac{(n_{HARQ} - 1)}{2}.$$

In case of a normal CP (cyclic prefix) and an extended CP in PUCCH format 2, 2a, and 2b, $h(n_{CQI}, n_{HARQ}, n_{SR})$ can be represented as Formula 4 and Formula 5, respectively.

$$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases}$$

[Formula 4]

$$h(n_{CQI}, n_{HARQ}, n_{SR}) =$$

[Formula 5]

$$\begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

If a user equipment transmits HARQ-ACK/SR of more than 11 bits in PUCCH format 3, $h(n_{CQI}, n_{HARQ}, n_{SR})$ can be represented as Formula 6. Otherwise, it can be represented as Formula 7 in the following.

$$h(n_{CQI}, n_{HARQ}, n_{SR}) = \frac{n_{HARQ} + n_{SR} - 1}{3}$$

[Formula 6]

$$h(n_{CQI}, n_{HARQ}, n_{SR}) = \frac{n_{HARQ} + n_{SR} - 1}{2}$$

[Formula 7]

If $P_{O\_UE\_PUCCH}$ value changes in an upper layer, it may correspond to g(0)=0. Otherwise, it may be represented as $g(0) = \Delta P_{rampup} + \delta_{msg2}$. $\delta_{msg2}$ is a TPC command indicated by a random access response and $\Delta P_{rampup}$ corresponds to the total power ramp-up from the first to the last preamble provided by an upper layer.

If a user equipment reaches a $P_{CMAX,c}$ for a primary cell c, a positive TPC command for the primary cell c is not accumulated. On the contrary, if the user equipment reaches lowest power, a negative TPC command is not accumulated. When $P_{O\_UE\_PUCCH}$ value is changed by an upper layer or a random access response message (msg2) is received, the user equipment resets accumulation.

Meanwhile, following Formula 8 and Formula 9 indicate $\delta_{PUCCH}$ value in a TPC command field of DCI format.

TABLE 8

| TPC Command Field in DCI format 1A/1B/1D/1/2A/2B/2C/2/3 | $\delta_{PUCCH}$ [dB] |
|---|---|
| 0 | −1 |
| 1 | 0 |
| 2 | 1 |
| 3 | 3 |

TABLE 9

| TPC Command Field in DCI format 3A | $\delta_{PUCCH}$ [dB] |
|---|---|
| 0 | −1 |
| 1 | 1 |

The maximum output power PCMAX configured by the formula 1 or the formula 3 can be restricted in a manner of being defined by formula 8 in the following.

$$P_{CMAX\_L} - T(P_{CMAX\_L}) \leq P_{CMAX} \leq P_{CMAX\_H} + T(P_{CMAX\_H})$$

[Formula 8]

In this case, $P_{CMAX\_L}$ and $P_{CMAX\_H}$ are defined by formula 9 described in the following.

$$P_{CMAX\_L} = \text{MIN}\{P_{EMAX\_H} - T_C, P_{PowerClass} - \text{MPR} - A - \text{MPR} - \Box T_C\},$$

$$P_{CMAX\_H} = \text{MIN}\{P_{EMAX\_H}, P_{PowerClass}\}$$

[Formula 9]

In this case, $P_{CMAX}$ can be defined as Table 10 in the following and $P_{CMAX\_L}$ and $P_{CMAX\_H}$ are individually applied. $P_{EMAX\_H}$ corresponds to a value given by IE P-Max defined in mobile communication standard document 3GPP TS 36.214. $P_{PowerClass}$ corresponds to maximum UE power which is written without considering tolerance. A base station can inform a user equipment of the $P_{PowerClass}$. The base station can signal A-MPR to the user equipment. A value of $\Delta T_C$ may correspond to a predetermined value. $T_C$ may correspond to 1.5 or 0 dB.

TABLE 10

$P_{CMAX}$ tolerance

| $P_{CMAX}$ (dBm) | Tolerance T($P_{CMAX}$) (dB) |
|---|---|
| $21 \le P_{CMAX} \le 23$ | 2.0 |
| $20 \le P_{CMAX} < 21$ | 2.5 |
| $19 \le P_{CMAX} < 20$ | 3.5 |
| $18 \le P_{CMAX} < 19$ | 4.0 |
| $13 \le P_{CMAX} < 18$ | 5.0 |
| $8 \le P_{CMAX} < 13$ | 6.0 |
| $-40 \le P_{CMAX} < 8$ | 7.0 |

In case of determining the configured UE maximum output power PCMAX, it may consider MPR (maximum power reduction) or A-MPR. Since the MPR corresponds to a value capable of being changed according to a modulation order or a channel bandwidth, the MPR can be represented as Table 11 in the following.

TABLE 11

| | Channel bandwidth/Transmission bandwidth configuration (RB) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

The A-MPR (additional-MPR) corresponds to maximum power reduction due to a region/band-specific additional request. The A-MPR can be represented as Table 12 in the following (it may refer to 3GPP LTE TS.36.101).

Table 12 shows A-MPR values.

TABLE 12

| Network Signalling value | Requirements (subclause) | E-UTRA Band | Channel bandwidth (MHz) | Resources Blocks ($N_{RB}$) | A-MPR (dB) |
|---|---|---|---|---|---|
| NS_01 | 6.6.2.1.1 | Table 5.5-1 | 1.4, 3, 5, 10, 15, 20 | Table 5.6-1 | N/A |
| NS_03 | 6.6.2.2.1 | 2, 4, 10, 23, 25, 35, 36, 66 | 3 | >5 | ≤1 |
| | | | 5 | >6 | ≤1 |
| | | | 10 | >6 | ≤1 |
| | | | 15 | >8 | ≤1 |
| | | | 20 | >10 | ≤1 |
| NS_04 | 6.6.2.2.2, 6.6.3.3.19 | 41 | 5, 10, 15, 20 | Table 6.2.4-4 | |
| NS_05 | 6.6.3.3.1 | 1 | 10, 15, 20 | ≥50 (NOTE1) | =1 (NOTE1) |
| | | | 15, 20 | Table 6.2.4-18 (NOTE2) | |
| | | 65 (NOTE 3) | 10, 15, 20 | ≥50 | =1 (NOTE1) |
| | | | 15, 20 | Table 6.2.4-18 (NOTE2) | |
| NS_06 | 6.6.2.2.3 | 12, 13, 14, 17 | 1.4, 3, 5, 10 | Table 5.6-1 | N/A |
| NS_07 | 6.6.2.2.3 6.6.3.3.2 | 13 | 10 | Table 6.2.4-2 | |
| NS_08 | 6.6.3.3.3 | 19 | 10, 15 | >44 | ≤3 |
| NS_09 | 6.6.3.3.4 | 21 | 10, 15 | >40 | ≤1 |
| | | | | >55 | ≤2 |
| NS_10 | | 20 | 15, 20 | Table 6.2.4-3 | |
| NS_11 | 6.6.2.2.1 6.6.3.3.13 | 23 | 1.4, 3, 5, 10, 15, 20 | Table 6.2.4-5 | |
| NS_12 | 6.6.3.3.5 | 26 | 1.4, 3, 5, 10, 15 | Table 6.2.4-6 | |
| NS_13 | 6.6.3.3.6 | 26 | 5 | Table 6.2.4-7 | |
| NS_14 | 6.6.3.3.7 | 26 | 10, 15 | Table 6.2.4-8 | |
| NS_15 | 6.6.3.3.8 | 26 | 1.4, 3, 5, 10, 15 | Table 6.2.4-9 Table 6.2.4-10 | |
| NS_16 | 6.6.3.3.9 | 27 | 3, 5, 10 | Table 6.2.4-11, Table 6.2.4-12, Table 6.2.4-13 | |
| NS_17 | 6.6.3.3.10 | 28 | 5, 10 | Table 5.6-1 | N/A |
| NS_18 | 6.6.3.3.11 | 28 | 5 | ≥2 | ≤1 |
| | | | 10, 15, 20 | ≥1 | ≤4 |
| NS_19 | 6.6.3.3.12 | 44 | 10, 15, 20 | Table 6.2.4-14 | |
| NS_20 | 6.2.2 6.6.2.2.1 6.6.3.3.14 | 23 | 5, 10, 15, 20 | Table 6.2.4-15 | |
| NS_21 | 6.6.2.2.1 6.6.3.3.15 | 30 | 5, 10 | Table 6.2.4-16 | |
| NS_22 | 6.6.3.3.16 | 42, 43 | 5, 10, 15, 20 | Table 6.2.4-17 | |
| NS_23 | 6.6.3.3.17 | 42, 43 | 5, 10, 15, 20 | N/A | |

TABLE 12-continued

| Network Signalling value | Requirements (subclause) | E-UTRA Band | Channel bandwidth (MHz) | Resources Blocks ($N_{RB}$) | A-MPR (dB) |
|---|---|---|---|---|---|
| NS_24 | 6.6.3.3.20 | 65 (NOTE 4) | 5, 10, 15, 20 | | Table 6.2.4-19 |
| NS_25 | 6.6.3.3.21 | 65 (NOTE 4) | 5, 10, 15, 20 | | Table 6.2.4-20 |
| NS_26 | 6.6.3.3.22 | 68 | 5, 10, 15 | | Table 6.2.4-21 |
| ... | | | | | |
| NS_32 | — | — | — | — | — |

(NOTE1)
Applicable when the lower edge of the assigned E-UTRA UL channel bandwidth frequency is larger than or equal to the upper edge of PHS band (1915.7 MHz) + 4 MHz + the channel BW assigned, where channel BW is as defined in subclause 5.6. A-MPR for operations below this frequency is not covered in this version of specifications except for the channel assignments in NOTE2 as the emissions requirement in 6.6.3.3.1 may not be met. For 10 MHz channel bandwidth whose carrier frequency is larger than or equal to 1945 MHz or 15 MHz channel bandwidth whose carrier frequency is larger than or equal to 1947.5 MHz, no A-MPR applies.
(NOTE2)
Applicable when carrier frequency is 1932.5 MHz for 15 MHz channel bandwidth or 1930 MHz for 20 MHz channel bandwidth case.
(NOTE 3):
Applicable when the E-UTRA carrier is within 1920-1980 MHz.
(NOTE 4):
Applicable when the upper edge of the channel bandwidth frequency is greater than 1980 MHz.

Table 13 shows A-MPR according to NS_04.

TABLE 13

| Channel bandwidth [MHz] | Parameters | | | | | |
|---|---|---|---|---|---|---|
| 5 | Fc [MHz] | | =2499.5 | | >2499.5 | |
| | $RB_{start}$ | | 0-8 | | 9-24 | 0-24 |
| | $L_{CRB}$ [RBs] | | >0 | | >0 | >0 |
| | A-MPR [dB] | | ≤2 | | 0 | 0 |
| 10 | Fc [MHz] | | =2504 | | | >2504 |
| | $RB_{start}$ | | 0-8 | | 9-35   36-49 | 0-49 |
| | $L_{CRB}$ [RBs] | ≤15 | >15 and <25 | ≥25 | N/A | >0 |
| | $RB_{start}$ + $L_{CRB}$ [RBs] | N/A | N/A | N/A | =45 | N/A | N/A |
| | A-MPR [dB] | ≤3 | ≤1 | ≤2 | ≤1 | 0 | 0 |
| 15 | Fc [MHz] | | ≤2510.8 | | | >2510.8 |
| | $RB_{start}$ | | 0-13 | | 14-59   60-74 | 0-74 |
| | $L_{CRB}$ [RBs] | ≤18 or ≥36 | >18 and <36 | N/A | >0 | >0 |
| | $RB_{start}$ + $L_{CRB}$ [RBs] | N/A | N/A | ≥62 | N/A | N/A |
| | A-MPR [dB] | ≤3 | ≤1 | ≤1 | 0 | 0 |
| 20 | Fc [MHz] | | ≤2517.5 | | | >2517.5 |
| | $RB_{start}$ | | 0-22 | | 23-76   77-99 | 0-99 |
| | $L_{CRB}$ [RBs] | ≤18 or ≥40 | >18 and <40 | N/A | >0 | >0 |
| | $RB_{start}$ + $L_{CRB}$ [RBs] | N/A | N/A | ≥86 | N/A | N/A |
| | A-MPR [dB] | ≤3 | ≤1 | ≤1 | 0 | 0 |

NOTE 1: $RB_{start}$ indicates the lowest RB index of transmitted resource blocks
NOTE 2: $L_{CRB}$ is the length of a contiguous resource block allocation
NOTE 3: For intra-subframe frequency hopping which intersects regions, notes 1 and 2 apply on a per slot basis
NOTE 4: For intra-subframe frequency hopping which intersects regions, the larger A-MPR value may be applied for both slots in the subframe Table 14 shows A-MPR according to NS_07.

TABLE 14

| Parameters | | Region A | | Region B | Region C |
|---|---|---|---|---|---|
| $RB_{start}$ | | 0-12 | | 13-18 | 19-42   43-49 |
| $L_{CRB}$ [RBs] | 6-8 | 1 to 5 and 9-50 | ≥8 | ≥18 | ≤2 |
| A-MPR [dB] | ≤8 | ≤12 | ≤12 | ≤6 | ≤3 |

NOTE 1;
$RB_{start}$ indicates the lowest RB index of transmitted resource blocks
NOTE 2;
$L_{CRB}$ is the length of a contiguous resource block allocation
NOTE 3:
For intra-subframe frequency hopping between two regions, notes 1 and 2 apply on a per slot basis
NOTE 4;
For intra-subframe frequency hopping between two regions, the larger A-MPR value of the two regions may be applied for both slots in the subframe.

Table 15 shows A-MPR according to NS_10.

TABLE 15

| Channel bandwidth [MHz] | Parameters | Region A |
|---|---|---|
| 15 | $RB_{start}$ | 0-10 |
| | $L_{CRB}$ [RBs] | 1-20 |
| | A-MPR [dB] | ≤2 |
| 20 | $RB_{start}$ | 0-15 |
| | $L_{CRB}$ [RBs] | 1-20 |
| | A-MPR [dB] | ≤5 |

NOTE 1:
$RB_{start}$ indicates the lowest RB index of transmitted resource blocks
NOTE 2:
$L_{CRB}$ is the length of a contiguous resource block allocation
NOTE 3:
For intra-subframe frequency hopping which intersects Region A, notes 1 and 2 apply on a per slot basis
NOTE 4:
For intra-subframe frequency hopping which intersect Region A, the larger A-MPR value may be applied for both slots in the subframe Table 16 shows A-MPR according to NS_11.

TABLE 16

| Channel Bandwidth [MHz] | Parameters | | | | | |
|---|---|---|---|---|---|---|
| 3 | Fc [MHz] | <2004 | ≥2004 | | | |
|  | $L_{CRB}$ [RBs] | 1-15 | >5 | | | |
|  | A-MPR [dB] | ≤5 | ≤1 | | | |
| 5 | Fc [MHz] | <2004 | 2004 ≤ Fc < 2007 | =2007 | | |
|  | $L_{CRB}$ [RBs] | 1-25 | 1-6 & 15-25 | 8-12 | >6 | |
|  | A-MPR [dB] | ≤7 | ≤4 | 0 | ≤1 | |
| 10 | Fc [MHz] | 2005 ≤ Fc < 2015 | 2015 | | | |
|  | $RB_{start}$ | 0-49 | 0-49 | | | |
|  | $L_{CRB}$ [RBs] | 1-50 | 1-50 | | | |
|  | A-MPR [dB] | ≤12 | 0 | | | |
| 15 | Fc [MHz] | <2012.5 | | | | |
|  | $RB_{start}$ | 0-4 | 5-21 | 22-56 | 57-74 | |
|  | $L_{CRB}$ [RBs] | ≥1 | 7-50 | 0-6 & ≥50 | ≤25 | >25 | >0 |
|  | A-MPR [dB] | ≤15 | ≤7 | ≤10 | 0 | ≤6 | ≤15 |
|  | Fc [MHz] | 2012.5 | | | | |
|  | $RB_{start}$ | 0-12 | 13-39 | 40-65 | 66-74 | |
|  | $L_{CRB}$ [RBs] | ≥1 | ≥30 | <30 | ≥(69-$RB_{start}$) | ≥1 |
|  | A-MPR [dB] | ≤10 | ≤6 | 0 | ≤2 | ≤6.5 |
| 20 | Fc [MHz] | 2010 | | | | |
|  | $RB_{start}$ | 0-12 | 13-29 | 30-68 | 69-99 | |
|  | $L_{CRB}$ [RBs] | ≥1 | 10-60 | 1-9 & >60 | 1-24 | ≥25 | ≥1 |
|  | A-MPR [dB] | ≤15 | ≤7 | ≤10 | 0 | ≤7 | ≤15 |

Referring to tables 13 to 16, RB_start indicates a lowest RB index of a transmitted resource block. L_CRB indicates a length of continuous resource block allocation. Regarding intra-subframe frequency hopping between two regions, a greater value of A-MPR among the two regions can be applied to both slots of a subframe.

A-MPR can be determined according to a start position (RB_start) of an RB and a bandwidth (L_CRB) of an RB unit in accordance with a channel bandwidth or regions (e.g., region A/B/C) divided from the channel bandwidth. MPR is applied without higher layer signaling. The MPR can be interpreted as a sort of an additional tolerance permitted to a terminal sales person. On the contrary, the A-MPR can be interpreted as a value to be considered to protect surrounding band from power leaked to a neighbor band when transmit power of a UE is configured.

As mentioned in the foregoing description, if a UE using a corresponding base station receives NS_xx of an SIB2 from the base station, the UE performs transmission by setting a limit on maximum transmission power (PCMAX- maximum transmit power set to the UE), which is configured according to an RB allocated using A-MPR table associated with each NS_xx, to control unnecessary projection of the UE affecting a neighboring band to be protected.

Meanwhile, in a next-generation system beyond 3GPP LTE(-A) (beyond LTE-(A) system), a low-cost/low-specification UE based on data communication such as meter reading, water level measurement, use of a surveillance camera, and inventory reporting of a vending machine is considered. Hereinafter, such a UE is referred to as an MTC device or an MTC UE. Since less data is transmitted by the MTC UE and many MTC UEs operate in one cell, if signal transmission for UL/DL scheduling/feedback is performed for each MTC UE at every moment, eNB overhead remarkably increases. In particular, if transmissions of UL data/feedback performed by the MTC UE are intermittent and not persistent, an eNB cannot persistently maintain UL time/frequency synchronization of the MTC UE. Therefore, for power saving of the MTC UE, it is desirable to perform UL data/feedback transmission by the MTC UE according to a random access preamble based RACH procedure.

Meanwhile, a situation in which a plurality of MTC UEs that perform the same/similar functions in a coverage-limited space for the purposes of measurement/detection/reporting/maintenance such as a specific building or warehouse are deployed/operated may be considered. Hereinafter, a plurality of MTC UEs that perform the same/similar functions in a coverage-limited space will be referred to as an MTC group. The MTC group may be implemented to intermittently transmit low volumes of data. Particularly, in the case of UL synchronization, since the MTC UEs are adjacent to each other in a coverage-limited space, there is a high probability that UEs that belong to the same MTC group have similar time/frequency synchronization.

Since an MTC UE is used to transmit less data and perform occasionally generated UL/DL data transmission/reception, it is efficient to lower the cost of the UE and reduce battery consumption according to the low data transmission rate. In addition, the MTC UE has low mobility and, therefore, a channel environment thereof rarely changes. Meanwhile, in consideration of up to a poor situation in which the MTC UE is installed in a coverage-limited place such as a basement as well as a building or a factory, various coverage enhancement schemes including a repeated transmission method for the MTC UE with respect to each channel/signal have been discussed.

Figure 11:
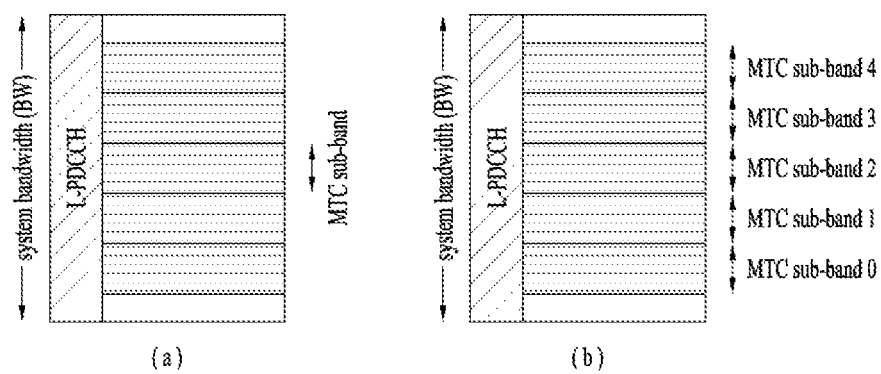
FIG. 11 illustrates a system BW or a sub-band region for an MTC UE.

As technology for a low-cost/low-specification UE, decrease in the number of reception antennas, decrease in a maximum transport block (TB) size, reduction in the operating frequency bandwidth (BW) of the UE, and the like, may be considered. In particular, reduction of the operating BW of the UE may be implemented such that the MTC UE can perform a signal transmission/reception operation only with respect to a predetermined BW (e.g. 1.4 MHz or 6 RBs) narrower than an actual system BW (e.g. 20 MHz or 100 RBs) in terms of radio frequency (RF) and/or baseband (BB) signal processing. If a minimum of 6 RBs is used for the system BW of the MTC UE, the MTC UE can advantageously discover/detect a cell that the MTC UE is to access by receiving and/or detecting a legacy PSS/SSS/PBCH. FIG. 11 is a diagram for a system BW or sub-band region for the MTC UE.

Referring to FIG. 11, PDCCH in a legacy system (hereinafter, legacy PDCCH) is transmitted on the whole band, whereas a signal for an MTC UE can be transmitted on a subband region corresponding to a part of the whole band. In this case, as shown in FIG. 11 (a), the subband region in which the MTC UE operates may correspond to a center region (e.g., center 6 Physical Resource Block; PRB) of a cell all the time. Or, as shown in FIG. 11 (b), it may be able to configure a plurality of subbands for the MTC UE for multiplexing between MTC UEs in a subframe. In this case, it may be able to use a different subband between UEs. Or, it may use a different subband instead of the center 6 PRBs while an identical subband is used between UEs.

Meanwhile, in the legacy system, in the case of various DL control channels (e.g. a PCFICH and a PHICH) including a PDCCH, as mentioned in the foregoing description, REs/REGs/CCEs constituting the control channels are transmitted over/throughout an entire system BW through a series of procedures such as interleaving and cyclic shift. When the UE needs to receive the control channel based on an entire system band of a connected RF, it is difficult to implement the UE with low-cost/low-specification. If the MTC UE is configured by the subband, the MTC UE is unable to properly receive legacy PDCCH transmitted via the whole system band. If PDCCH for the MTC UE is transmitted in an OFDM symbol region in which the legacy PDCCH is transmitted due to a multiplexing issue with PDCCH transmitted to a different UE, it is not preferable.

As a solution for this, it is necessary to introduce a control channel which is transmitted in a sub-band in which MTC is operating for the MTC UE. In order to introduce a downlink control channel for the low-complexity MTC UE, it may use legacy EPDCCH as it is or it may be able to introduce a control channel corresponding to a variation of the legacy EPDCCH. In the present invention, a physical downlink control channel introduced for the low-complexity MTC UE or a normal complexity MTC UE is commonly referred to as EPDCCH. For the same reason, a physical downlink control channel transmitted to the MTC UE is also restricted to a sub-band received by a UE.

The present invention is explained under the assumption that a corresponding sub-band or a narrow band is set to a UE in advance. In other word, the present invention is explained under the assumption that the UE knows a sub-band set to the UE. The sub-band set to the UE can be changed into a different sub-band instead of being fixed.

The present invention is explained under the assumption that signal transmission and reception proposed by the present invention is used for the MTC UE. Yet, it is apparent that the present invention can also be applied to a case of using the signal transmission and reception for a different general UE rather than the MTC.

In order to smoothly perform various operations of a low-spec UE, it is necessary to enable communication between a UE and an eNB to be performed even in a situation that the UE is installed in a position at which a channel state is poor. As a method of performing the coverage enhancement, there is a repetition method that the UE transmits the same data several times. In this case, the repetition can be performed by repeatedly transmitting a specific redundancy version resulted from performing channel coding on a specific data or alternately transmitting a different redundancy version according to a result of channel coding performed on the same data. If a repetition number increases, it is able to transmit and receive a given data using more energy. Hence, it is able to overcome poorer channel environment and increase coverage more.

When the repeated transmission method is used, it may use a multi-subframe channel estimation method as a method of increasing reception capability. When a UE performs repeated transmission using the same frequency resource during prescribed time, an eNB can increase channel estimation capability by using DM RSs (Demodulation Reference Signals) located at a plurality of subframes at the same time, thereby increasing final decoding capability as well. In case of performing multi-subframe channel estimation, a main assumption is that almost the same channel is maintained in time domain corresponding to a target of the multi-subframe channel estimation because a channel change between a UE and an eNB is very limitative in the time domain.

When the eNB performs the multi-subframe channel estimation on the repeated transmission based on the above-mentioned assumption, a problem of controlling transmission timing of the UE may occur. And, a problem of controlling transmit power may occur as well.

In the following, a method for efficiently performing multi-subframe channel estimation is explained through various embodiments including the timing advance, transmit power control, and the like.

First of all, as an embodiment, a method of applying timing advance for efficiently performing multi-subframe channel estimation is explained.

In Case of Applying Timing Advance

As mentioned in the foregoing description, a UE starts UL transmission at the timing where timing is advanced as much as a prescribed value on the basis of DL reception timing to compensate for transmission delay between an eNB and the UE. This is referred to as timing advance (TA). A TA value may change as follows depending on a situation. The TA value can be controlled by the eNB via a TAC (TA command) or can be controlled by the UE to recognize the change of the DL reception timing and maintain the transmission timing. Meanwhile, if a huge change occurs on the TA value at a time, since it is difficult for a transmission end and a reception end to reflect the change, a required change value can be finally achieved by changing the TA value little by little over time.

When a UE performs repeated transmission, TA should also be applied. Although the UE is not moving, a path of a DL signal can be changed due to the movement of a surrounding reflector and arrival timing of the DL signal can be changed. And, transmission/reception timing can be drifted due to a clock difference between an eNB and a UE in a situation there is no movement. Hence, it is necessary to adjust transmission timing via an appropriate TA.

In this case, it is necessary to have a regulation on whether or not it is able to adjust transmission timing while a UE performs repeated transmission. In particular, when an eNB performs multi-subframe channel estimation, it may add a specific constraint to the adjustment of the transmission timing. In particular, when the UE adjusts the transmission timing and the timing at which a signal arrives at the eNB is changed according to the adjustment of the transmission timing, a sort of time shift occurs and the time shift appears as a phase rotation in frequency domain. Hence, if the time shift occurs in the middle of performing the multi-subframe channel estimation, it appears as a channel is actually changed and the basic assumption of the multi-subframe channel estimation is damaged, thereby deteriorating performance.

In order to solve the abovementioned problem, the present invention proposes a method for a UE to set an appropriate limit on TA adjustment. It may be able to maintain channel measurement performance using the method.

Specifically, the present invention proposes that the UE assumes a prescribed time section as a section in which the multi-subframe channel estimation is performed and transmission timing is maintained in the time section. Hereinafter, the section in which the multi-subframe channel estimation is performed is referred to as an RSCW (reference signal combining window). Or, the prescribed time section assumed by the UE may correspond to a section corresponding to a repetition number. In the following drawings and explanation on the drawings, for clarity, an RSCW is explained for example. Yet, the RSCW can be replaced with a section corresponding to a repetition number.

Meanwhile, the transmission timing can be maintained via one of methods described in the following. One method is to maintain a TA value by a UE. If a change occurs at DL reception timing, since a TA value is maintained, UL transmission timing is changed. For example, if the DL reception timing is delayed as much as prescribed time in a repeated transmission section or an RSCW, the UL transmission timing is also delayed as much as the prescribed time. According to the present scheme, since the UE maintains the TA value only, implementation is simple.

Another method is to maintain transmission timing of a UE by the UE. In this case, if a change occurs at DL reception timing, the same amount of change is reflected to a TA value to maintain UL transmission timing. For example, if the DL reception timing is delayed in a repeated transmission section or an RSCW, it may increase the TA value to maintain the UL transmission timing to be identical to the legacy UL transmission timing. According to the present scheme, since it is necessary for the UE to compare the past transmission timing with the current transmission timing. In particular, since it is necessary to have a more accurate timing reference, implementation of the present scheme may become complex.

A method of maintaining transmission timing in a repeated transmission section or an RSCW is explained in the following through various embodiments. In order to maintain the transmission timing, a UE can perform all or a part of operations described in the following. Basically, a TA value or transmission timing is changed at a boundary of the repeated transmission section or the RSCW only. In the following, assume that transmission timing is maintained by maintaining a TA value. Yet, as mentioned in the second method, transmission timing identical to legacy transmission timing can be maintained by changing a TA value.

Figure 12:
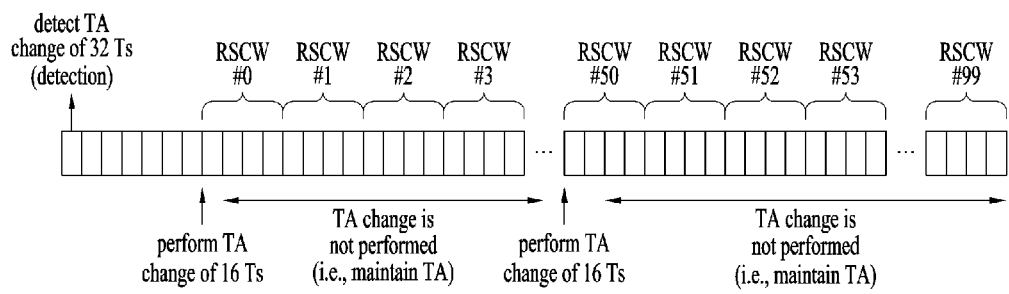
FIG. 12 is a diagram for explaining timing to which timing advance is applied according to one embodiment of the present invention.

FIG. 12 is a diagram for explaining a method of applying TA when multi-subframe measurement is performed according to embodiment of the present invention. In the following, the method of applying the TA is explained via various embodiments with reference to FIG. 12. In FIG. 12, although it is assumed that a repeated transmission section or an RSCW in which data is repeatedly transmitted is configured by 4 subframes, the repeated transmission section can be configured to have various sections according to a status.

If a TAC is received in a subframe n, a UE applies a value received from a repeated transmission section or an RSCW firstly starting in a subframe n+x or after the subframe n+x. In the following, assume that the x corresponds to processing time for processing a TAC. In this case, n+x may correspond to a first UL subframe after the processing time in consideration of a subframe configuration in TDD. In particular, the x may correspond to KPUSCH or KPUCCH in the explanation on the transmit power. It means that the UE is able to apply a new TAC from the subframe n+x in the aspect of processing. Yet, if the subframe n+x is not a start subframe of a specific repeated transmission section or an RSCW, the UE may delay applying the new TAC. Or, the x may correspond to KPUSCH or KPUCCH in the explanation on the transmit power.

In particular, the UE applies a TAC in a subframe n+y (y>=x) and the subframe n+y becomes a first subframe of a specific repeated transmission section or an RSCW. In other word, the UE applies the same TA value to subframes belonging to a repeated transmission section.

If the processing time corresponds to 4 and a TAC is received in a second subframe of an RSCW #0, a subframe n+4 corresponds to a second subframe of an RSCW #1. Hence, a boundary n+y of the timing at which the TAC is applied may correspond to a first subframe of an RSCW #2.

In this case, if a UL channel or a UL signal is not previously transmitted in a subframe n+x, the UE may immediately apply a TAC without waiting for the application of the TAC until a next repeated transmission section or an RSCW.

Although a change is sensed at DL signal reception timing, the UE does not change a TA value in a specific repeated transmission section or an RSCW. The sensed change of the DL signal reception timing is applied from a start subframe of a next repeated transmission section or an RSCW. In this case, when the change of the DL signal reception timing is sensed, if no repeated transmission is performed in UL, it may immediately change UL transmission timing or a TA value. Meanwhile, in the aspect of transmission timing itself, although a change is sensed at DL signal reception timing, transmission timing is not changed.

If a big change of TA is necessary at a time, the UE can apply the change little by little. In this case, the timing to which the change is applied is restricted to a start timing of a repeated transmission section or an RSCW.

The abovementioned procedure is explained in more detail in the following with reference to FIG. 12. In an example of FIG. 12, assume that a length of a repeated transmission section or an RSCW corresponds to 4 subframes and a maximum TA change during 200 ms is restricted to 16 Ts when a TA change of 32 Ts is necessary at a time. In this case, a UE reflects the change of 32 Ts over 400 ms in total in a unit of 16 Ts during 200 ms. As mentioned in the foregoing description, the UE applies the change as much as 16 Ts of two times at a start subframe only of the repeated transmission section or the RSCW. Hence, referring to FIG. 12, if a TA value as much as 16 Ts is adjusted in an RSWP #0, a TA value as much as 16 Ts is adjusted in an RSWP #50 after 200 ms is elapsed.

In the foregoing description, if a TA changes, although it may indicate a case that at least a part of a TA value is changed, it may also indicate a case that the TA value is changed with a value equal to or greater than a predetermined value. This means that a TA change equal to or less than a prescribed value has an insignificant influence on a phase change of an RS and multi-subframe channel estimation is still valid. In this case, when a change of a big TA occurs, a UE cumulatively changes a TA change equal to or less than a predetermined value in a time section in which TA is maintained to achieve the change of the big TA.

An operation of adjusting a TA value or an operation of adjusting UL transmission timing in the inside of a repeated transmission section or an RSCW can be partly and exceptionally permitted in the following cases.

If a prescribed gap for performing frequency hopping exists in the inside of the repeated transmission section or the RSCW, it may be able to immediately adjust a TA value or UL transmission timing from the transmission after the gap. As an example of the gap, there is a subframe incapable of being transmitted due to a transmission frequency hopped by the UE.

If a subframe is not utilized as repetition within a repeated transmission section or an RSCW, it may be able to immediately adjust a TA value or UL transmission timing from the transmission after the subframe.

If transmission is not performed in the last symbol of a specific subframe within a repeated transmission section or an RSCW, it may be able to immediately adjust a TA value or UL transmission timing from a next subframe of the specific subframe. As an example for a case of not performing transmission in the last symbol, there is a case of using PUSCH or PUCCH of a shortened format to transmit an SRS of a different UE.

In the following, a method of defining a repeated transmission section or an RSCW is explained.

In general, a repeated transmission section or an RSCW can be configured in a manner of dividing the total time by time of a length, which is assumed that a channel is not changed in multi-subframe channel estimation. A size of the repeated transmission section or the RSCW can be determined by a prescribed value in advance. Or, an eNB can designate the size of the repeated transmission section or the RSCW in consideration of a channel state change of a UE, and the like.

The repeated transmission section or the RSCW can be defined by a time section in which transmission is maintained in a frequency. When transmission is continuously performed in the same frequency while repeated transmission is performed, if a channel of the frequency is poor, reception performance can be deteriorated. In order to avoid the deterioration of the reception performance, it may perform frequency hopping. As mentioned in the foregoing description, the frequency hopping is to repeat an operation of maintaining transmission during prescribed time by moving to a different frequency after transmission is maintained during prescribed time in a specific frequency. In this case, since it is unable to perform multi-subframe channel estimation in a different frequency, a time section in which transmission is maintained in a frequency may become the repeated transmission section or the RSCW.

Or, the RSCW can be determined in consideration of a determined repeated transmission section or a size of the RSCW and the number of repetition of a UL signal. If a channel state between a UE and an eNB is not very poor, the relatively less number of repetitions is sufficient enough for determining the RSCW. In this case, repetition shorter than the length of the abovementioned repeated transmission section or the RSCW may occur. In this case, if a next repetition starts after a repetition ends, there is no problem in changing a TA value or transmission timing, although there is a single repeated transmission section or RSCW. Hence, a length of a final repeated transmission section, a size of an RSCW, or a length of a time section in which a TA value or transmission timing is not changed can be determined by a smaller value among the determined repeated transmission section, the RSCW size, and the number of repetitions of the UL signal.

Meanwhile, it may set a restriction on a TA size capable of being adjusted at a time by a UE and a minimum/maximum value of adjustment accumulated during prescribed time. The restriction varies according to a DL system bandwidth. This is because measurement accuracy of a DL signal varies according to a bandwidth. For example, since an error can be increased in a narrower bandwidth, a bigger change is permitted. Although an LC MTC UE operates on a wider system bandwidth, since it is able to measure a DL signal in a unit of a sub-band only, TA can be adjusted using a restriction value corresponding to a size of a sub-band.

In Case of Adjusting Transmit Power

In the following, timing to which transmit power adjustment is applied is explained according to a different embodiment of the present invention.

According to the aforementioned operation, indication of an eNB is applied in a unit of a specific time unit, e.g., an RSCW or repetition. The operation can also be applied to a case of transmit power control. When a UE repeatedly transmits data in a repeated transmission section or an RSCW section, if the UE changes transmit power, the UE is unable to perform an operation of combining RSs under the assumption of the same transmit power.

Hence, it may be preferable to maintain transmit power in the repeated transmission section or the RSCW section. In the following, a method of maintaining the transmit power in the repeated transmission section or the RSCW section is explained through various embodiments. In order to maintain the transmit power, a UE can perform all or a part of operations described in the following.

As an example of controlling transmit power, as mentioned earlier in formulas 1 and 2, it may use a TPC command or calculate a pathloss value due to a UE. In the following, a method of adjusting transmit power is explained using the two factors including the TPC command and the pathloss value.

First of all, when a TPC command is received, the present invention proposes a method of maintaining transmit power while repetition is performed according to a repetition number or in an RSCW by controlling the timing to which the command is applied.

Although a TPC command is received or a pathloss value is differentiated at specific timing, a UE can apply the TPC command or the pathloss value at a boundary of a time unit corresponding to repeated transmission or an RSCW only. In particular, if the UE changes transmit power, the UE should readjust the output of an amplifier. In this case, due to the limit in implementing the amplifier, a signal of a phase different from a phase of a legacy output signal can be transmitted. As a result, it may have such a result that a phase of a signal before transmit power is changed is different from a phase of a signal after the transmit power is changed. In particular, a basic assumption for performing multi-subframe channel estimation is disabled. Hence, an operation of maintaining transmit power in a specific time unit is also necessary for performing the multi-subframe channel estimation. In this case, the specific time unit corresponds to a repeated transmission section or an RSCW in which the repetition is performed.

Basically, a TPC value is changed at a boundary of a repeated transmission section or an RSCW only. In the following, assume that transmission timing is maintained by maintaining the TPC value. Yet, the transmission timing can also be maintained by maintaining the pathloss value.

Figure 13:
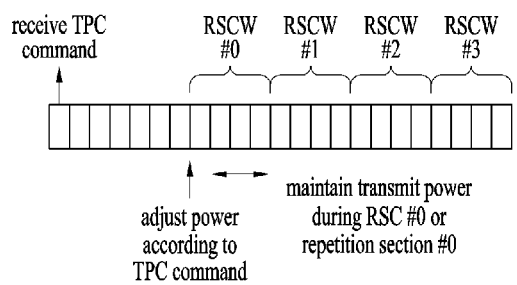
FIG. 13 is a diagram for explaining timing to which timing advance is applied according to a different embodiment of the present invention.

FIG. 13 is a diagram for explaining a method of applying a received TPC when multi-subframe channel estimation is performed according to an embodiment of the present invention. In the following, when a TPC command is received, a method of applying the TPC is explained according to various embodiments of the present invention with reference to FIG. 13. In FIG. 13, assume a case that a repeated transmission section or an RSCW in which data is repeatedly transmitted is configured by 4 subframes. Yet, the repeated transmission section can be configured to have various sections according to a situation.

If a TPC command is received in a subframe n, a UE applies a value received from a repeated transmission section or an RSCW firstly starting in a subframe n+x or after the subframe n+x. In the following, assume that the x corresponds to processing time for processing a TAC. In this case, n+x may correspond to a first UL subframe after the processing time in consideration of a subframe configuration in TDD. In particular, the x may correspond to KPUSCH or KPUCCH in the explanation on the transmit power. It means that the UE is able to apply a new TPC from the subframe n+x in the aspect of processing. Yet, if the subframe n+x is not a start subframe of a specific repeated transmission section or an RSCW, the UE may not apply the TPC in the subframe n+x. Moreover, it means that the UE may delay applying the TPC until a subframe starting after the subframe n+x.

In particular, the UE applies the TPC in a subframe n+y (y>=x) and the subframe n+y becomes a start subframe of a specific repeated transmission section or an RSCW. In other word, the UE applies the same TPC value to subframes belonging to a repeated transmission section to maintain transmit power.

The abovementioned operation is explained in detail with reference to FIG. 13. In this case, assume that processing time corresponds to 7 (ms). And, assume an RSCW or a repetition section configured to perform repeated transmission includes 4 subframes. If a TPC command is received in a subframe n, a subframe n+7 corresponds to a first subframe of an RSCW #0. Hence, the TPC received in the subframe n is applied to the subframe n+7 in the RSCW #0 and repeated transmission is performed in subframes belonging to the RSCW #0 using corresponding transmit power.

Similarly, assume that processing time corresponds to 7 (ms). If a TPC command is received in the third subframe of the RSCW #0, the subframe n+7 corresponds to the second subframe of an RSCW #2. Hence, TPC is not applied in the RSCW #2. A boundary n+y of the timing to which the TPC is applied corresponds to the first subframe of an RSCW #3.

In this case, if a UL channel or a UL signal is not previously transmitted in a subframe n+x, the UE may immediately apply TPC without waiting for the application of the TPC until a next repeated transmission section or an RSCW.

Although a change is sensed at DL signal reception timing, the UE does not change a TPC value in a specific repeated transmission section or an RSCW. The sensed change of the DL signal reception timing is applied from a start subframe of a next repeated transmission section or an RSCW. In this case, when the change of the DL signal reception timing is sensed, if no repeated transmission is performed in UL, it may immediately change UL transmission timing or a TA value. Meanwhile, in the aspect of transmission timing itself, although a change is sensed at DL signal reception timing, transmission timing is not changed.

If a change of a big TPC value is necessary at a time, the UE can apply the change little by little. In this case, the timing to which the change is applied is restricted to a start timing of a repeated transmission section or an RSCW.

In the foregoing description, if transmit power changes, although it may indicate a case that at least a part of a value of the transmit power is changed, it may also indicate a case that the transmit power value is changed with a value equal to or greater than a predetermined value. This means that a transmit power change equal to or less than a prescribed value has an insignificant influence on a phase change of an RS and multi-subframe channel estimation is still valid. In this case, when a big change of transmit power occurs, a UE cumulatively changes a transmit power change equal to or less than a predetermined value in a time section in which transmit power is maintained to achieve the big change of the transmit power.

In this case, similar to the TA case, if the change of the transmit power is equal to or less than a predetermined value and a change of a phase is sufficiently small, it may exceptionally permit the change of the transmit power. In other word, if a high degree of power change is required, it can be reflected in a manner of accumulating a power change equal to or less than a prescribed value several times.

Although transmit power of a UE can be controlled by a TPC command indicated by an eNB, the transmit power of the UE can also be controlled by open loop-power control that autonomously determines a power value of the UE to make the UE calculate pathloss with the eNB and compensate for the pathloss. Hence, as mentioned in the foregoing description, if the UE evenly maintains transmit power during prescribed time, it means that transmission is continuously performed using transmit power determined by a legacy pathloss value although a pathloss measurement value is changed during the prescribed time.

A unit for maintaining the transmit power of the UE may correspond to the aforementioned RSCW or the repetition unit. Yet, changing the transmit power in the inside of the unit can be exceptionally permitted in the following cases.

If a prescribed gap for performing frequency hopping exists in the inside of the repeated transmission section or the RSCW, it may be able to immediately adjust a power value or UL transmission timing from the transmission after the gap. As an example of the gap, there is a subframe incapable of being transmitted due to a transmission frequency hopped by the UE.

If a subframe is not utilized as repetition within a repeated transmission section or an RSCW, it may be able to immediately adjust a power value or UL transmission timing from the transmission after the subframe.

If transmission is not performed in the last symbol of a specific subframe within a repeated transmission section or an RSCW, it may be able to immediately adjust a power value or UL transmission timing from a next subframe of the specific subframe. As an example for a case of not performing transmission in the last symbol, there is a case of using PUSCH or PUCCH of a shortened format to transmit an SRS of a different UE.

In case of PUSCH transmission that performs many number of repetitions, in order to reduce the number of repetitions, a UE can be configured to use maximum transmit power all the time. In this case, since open-loop power control or closed-loop power control is not applied, it can be considered as transmit power of the UE is not changed.

Yet, if hopping is performed to obtain frequency diversity while a PUSCH transmission frequency resource is repeated, a situation of changing transmit power of a UE may occur while the PUSCH transmission frequency resource is repeated. When the UE performs transmission in a specific frequency band, it is necessary to satisfy a requirement that interference affecting a neighboring different band is equal to or less than a prescribed level. In this case, if a filter function of the UE is not sufficient, the requirement can be satisfied by reducing the maximum transmit power of the UE. This is referred to as maximum power restriction or maximum power reduction. A parameter for indicating the maximum power reduction includes MPR (maximum power reduction), A-MPR (additional-MPR), and the like. In particular, when interference affecting an adjacent band is ignored, if a UE capable of using 23 dBm as maximum transmit power applies MPR of 2 dB to satisfy a requirement for the interference of the adjacent band, maximum transmit power capable of being actually used becomes 21 dBm.

In the following, although embodiments of the present invention are applied under the assumption of MPR, the embodiments can also be extensively applied to a parameter related to maximum power restriction. For example, following items can also be applied to A-MPR.

As mentioned in the foregoing description, an MPR value varies according to a position of an RB in which PUSCH is transmitted, the number of RBs, and a modulation scheme. In particular, if an MTC UE performs frequency hopping for coverage enhancement while uplink channel transmission is repeated, the MPR value is changed according to a position of an RB which is transmitted after the hopping. As a result, maximum transmit power is changed. In the following, a method for a UE configured to use maximum transmit power all the time to determine transmit power in each subframe is proposed.

Method 1

A UE determines maximum transit power at every hopping timing and can consistently use the determined value to perform transmission in the same RB.

The UE transmits PUSCH in a specific RB at specific timing using a frequency hopping pattern. In this case, the UE identifies MPR necessary for performing transmission in the RB and performs transmission in the RB using maximum transmit power to which the MPR is reflected.

As a result, same transmit power is maintained in a section repeated in the same RB. Yet, if an RB is changed due to frequency hopping while repeated transmission is performed, maximum transmit power is determined again. Hence, transmit power can be changed according to the maximum transmit power. An eNB reflects the changed transmit power and does not use a DMRS of a subframe in which a PUSCH transmission RB is changed due to the frequency hopping in performing channel estimation. According to the method 1, a procedure of determining the transmit power of the UE is performed at every hopping timing and the same power is used in the same RB after the hopping is performed.

Method 2

A UE determines maximum transmit power at start timing of repetition and uses the determined maximum transmit power for the entire repetition.

In this case, the determined maximum transmit power should consider all MPR in an RB position to be used for frequency hopping. For example, when an RB 1 is used in a specific repetition section 1 and an RB 2 is used in a repetition section 2, the UE calculates MPR 1 necessary for using the RB 1 and MPR2 necessary for using the RB2. Subsequently, the UE configures a maximum value among the MPR 1 and the MPR 2 as overall MPR and applies the overall MPR to all transmissions. As a result, transmit power of the UE is evenly maintained while repetition is performed and a case of using power smaller than maximum power capable of being actually used by the UE may occur in a specific time section. According to the method 2, since it is able to determine transmit power one time only while repetition is performed, it is able to simplify a transmit power determination procedure.

In this case, if frequency hopping of an MTC UE occurs in a subframe unit, the maximum transmit power can be calculated in a unit of a subframe or a unit of a repetition section including at least one subframe. Or, power calculation can be performed in a unit of a slot.

Figure 14:
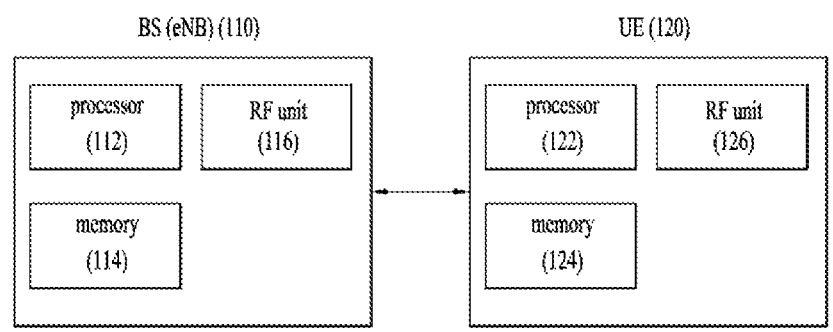
FIG. 14 illustrates a base station and a user equipment applicable to an embodiment of the present invention.

FIG. 14 illustrates a BS and a UE of a wireless communication system, which are applicable to embodiments of the present invention. When the wireless communication system includes a relay, the BS or UE can be replaced by the relay Referring to FIG. 14, the wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, BS or other apparatuses (e.g. a relay) of a wireless communication apparatus. Specifically, the present invention is applicable to a method for transmitting control information and an apparatus for the same.

What is claimed is:

1. A method of controlling uplink transmit power, which is controlled by an MTC UE in a wireless communication system supporting MTC (machine type communication), comprising the steps of:
    calculating a first maximum power reduction value to be applied to a first uplink channel; and
    transmitting the first uplink channel using maximum transmit power to which the first maximum power reduction value is applied in a plurality of subframes,
    wherein the first uplink channel is transmitted via frequency resources different from each other within a plurality of the subframes, wherein the maximum transmit power includes a different value according to a frequency resource in which a specific channel is transmitted, and wherein a prescribed value is applied to the first maximum power reduction value while the first uplink channel is transmitted.

2. The method of claim 1, wherein the maximum power reduction value corresponds to MPR (maximum power reduction).

3. The method of claim 1, wherein the maximum power reduction value corresponds to A-MPR (advanced-maximum power reduction).

4. The method of claim 1, wherein the first maximum power reduction value corresponds to a maximum value among maximum power reduction values which are calculated according to each of the plurality of the subframes.

5. The method of claim 1, wherein the first maximum power reduction value corresponds to a maximum value among maximum power reduction values which are calculated according to each of a slots within the plurality of the subframes.

6. The method of claim 1, wherein the maximum power reduction value is determined according to at least one selected from the group consisting of a position of a resource block of the first uplink channel, the number of resource blocks, and a modulation scheme.

7. The method of claim 1, wherein the first uplink channel corresponds to a physical uplink control channel (PUCCH) for transmitting uplink control information or a physical uplink data channel (PUSCH) for transmitting user data.

8. An MTC UE for controlling uplink transmit power in a wireless communication system supporting MTC (machine type communication), comprising:
    a transceiver; and
    a processor configured to control the transceiver, the processor configured to calculate a first maximum power reduction value to be applied to a first uplink channel, the processor configured to transmit the first uplink channel using maximum transmit power to which the first maximum power reduction value is applied in a plurality of subframes,
    wherein the first uplink channel is transmitted via frequency resources different from each other within a plurality of the subframes, wherein the maximum transmit power included a different value according to a frequency resource in which a specific channel is transmitted, and wherein a prescribed value is applied to the first maximum power reduction value while the first uplink channel is transmitted.

9. The MTC UE of claim 8, wherein the maximum power reduction value corresponds to MPR (maximum power reduction).

10. The MTC UE of claim 8, wherein the maximum power reduction value corresponds to A-MPR (advanced maximum power reduction).

11. The MTC UE of claim 8, wherein the first maximum power reduction value corresponds to a maximum value among maximum power reduction values which are calculated according to each of the plurality of the subframes.

12. The MTC UE of claim 8, wherein the first maximum power reduction value corresponds to a maximum value among maximum power reduction values which are calculated according to each of a slot within the plurality of the subframes.

13. The MTC UE of claim 8, wherein the maximum power reduction value is determined according to at least one selected from the group consisting of a position of a resource block of the first uplink channel, the number of resource blocks, and a modulation scheme.

14. The MTC UE of claim 8, wherein the first uplink channel corresponds to a physical uplink control channel (PUCCH) for transmitting uplink control information or a physical uplink data channel (PUSCH) for transmitting user data.

* * * * *